US008808031B2

(12) United States Patent
Zhao

(10) Patent No.: US 8,808,031 B2
(45) Date of Patent: Aug. 19, 2014

(54) BATTERY CONNECTOR SYSTEM

(71) Applicant: Tyco Electronics Corporation, Berwyn, PA (US)

(72) Inventor: Weiping Zhao, Superior Township, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 48 days.

(21) Appl. No.: 13/713,249

(22) Filed: Dec. 13, 2012

(65) Prior Publication Data
US 2013/0288530 A1 Oct. 31, 2013

Related U.S. Application Data

(60) Provisional application No. 61/630,552, filed on Dec. 14, 2011.

(51) Int. Cl.
*H01R 13/66* (2006.01)
(52) U.S. Cl.
USPC ............. 439/620.27; 439/620.29; 439/620.33
(58) Field of Classification Search
USPC ............. 439/620.26, 620.27, 620.29, 620.33, 439/620.34
See application file for complete search history.

(56) References Cited

U.S. PATENT DOCUMENTS

| 4,842,534 | A | * | 6/1989 | Mobley et al. | 439/214 |
| 5,643,693 | A | * | 7/1997 | Hill et al. | 429/121 |
| 5,645,448 | A | * | 7/1997 | Hill | 439/522 |
| 5,795,193 | A | * | 8/1998 | Yang | 439/620.27 |
| 5,882,213 | A | * | 3/1999 | Witek et al. | 439/76.2 |
| 5,886,611 | A | * | 3/1999 | Schaller et al. | 337/189 |
| 6,227,913 | B1 | * | 5/2001 | Davis et al. | 439/620.26 |
| 6,280,253 | B1 | * | 8/2001 | Kraus et al. | 439/620.27 |
| 6,544,077 | B2 | * | 4/2003 | Ikeda | 439/736 |
| 6,558,198 | B2 | * | 5/2003 | Kobayashi et al. | 439/620.29 |
| 6,716,065 | B1 | * | 4/2004 | Brooks | 439/620.27 |
| 6,759,938 | B2 | * | 7/2004 | Matsumura et al. | 337/161 |
| 6,793,534 | B2 | * | 9/2004 | Cheng et al. | 439/620.04 |
| 6,806,421 | B2 | * | 10/2004 | Matsumura | 174/50 |
| 6,830,482 | B2 | * | 12/2004 | Matsumura et al. | 439/620.27 |
| 6,910,923 | B2 | * | 6/2005 | Nakanishi | 439/620.26 |

(Continued)

FOREIGN PATENT DOCUMENTS

| EP | 2 393 145 A1 | 12/2011 |
| GB | 2 452 516 A | 3/2009 |
| WO | 2011 134829 A1 | 11/2011 |

OTHER PUBLICATIONS

International Search Report, International Application No. PCT/US2012/069612, International Filing Date, Dec. 14, 2012.

*Primary Examiner* — Ross Gushi

(57) ABSTRACT

A battery connector system includes a tray assembly configured to be mounted to a battery module made from a plurality of battery cells. The tray assembly has a tray and a plurality of busbars held by the tray. The tray has a tray connector defining a mating interface being configured to mate with an electrical connector. The electrical connector may be either a wire harness connector or a circuit board connector. The busbars are coupled to the tray and have plates being configured to be electrically connected to corresponding cell tabs of the battery cells. The busbars have fuse terminals positioned in the tray connector. A plurality of fuses are coupled to the fuse terminals. The fuses may be serviceable fuses or resettable fuses. The fuses are connected between the plates of the busbars and the electrical connector.

22 Claims, 14 Drawing Sheets

(56) References Cited

U.S. PATENT DOCUMENTS

| | | | | |
|---|---|---|---|---|
| 6,948,982 | B2* | 9/2005 | Higuchi et al. | 439/620.26 |
| 7,071,808 | B2* | 7/2006 | Nakamura | 337/256 |
| 7,176,780 | B2* | 2/2007 | Iwata | 337/188 |
| 7,396,262 | B2* | 7/2008 | Korczynski et al. | 439/723 |
| 7,420,453 | B2* | 9/2008 | Matsumura et al. | 337/295 |
| 7,592,892 | B2* | 9/2009 | Ito et al. | 337/159 |
| 7,663,465 | B2* | 2/2010 | Matsumoto et al. | 337/187 |
| 7,663,466 | B1* | 2/2010 | Jetton | 337/191 |
| 7,670,184 | B2* | 3/2010 | Akahori et al. | 439/620.27 |
| 7,683,752 | B1* | 3/2010 | Huss | 337/206 |
| 7,726,981 | B2* | 6/2010 | Kubota et al. | 439/76.2 |
| 7,727,022 | B2* | 6/2010 | Polehonki et al. | 439/620.27 |
| 7,851,081 | B2* | 12/2010 | Ha et al. | 429/160 |
| 7,893,809 | B2* | 2/2011 | Head | 337/194 |
| 7,927,728 | B2* | 4/2011 | Ha et al. | 429/61 |
| 7,990,738 | B2* | 8/2011 | Urrea et al. | 361/833 |
| 8,235,732 | B2* | 8/2012 | Garascia et al. | 439/76.2 |
| 8,492,015 | B2* | 7/2013 | Ramakrishnan et al. | 429/65 |
| 8,580,423 | B2* | 11/2013 | Kim | 429/161 |
| 8,638,188 | B2* | 1/2014 | Iwata et al. | 337/186 |
| 8,665,056 | B2* | 3/2014 | Urrea et al. | 337/188 |
| 8,669,840 | B2* | 3/2014 | Urrea et al. | 337/188 |
| 2001/0011939 | A1* | 8/2001 | Inaba et al. | 337/265 |
| 2001/0027060 | A1* | 10/2001 | Kondo et al. | 439/620 |
| 2004/0008503 | A1* | 1/2004 | Higuchi et al. | 361/833 |
| 2004/0124963 | A1* | 7/2004 | Nakamura | 337/256 |
| 2004/0130430 | A1* | 7/2004 | Matsumura et al. | 337/181 |
| 2005/0116806 | A1* | 6/2005 | Iwata | 337/188 |
| 2007/0267917 | A1* | 11/2007 | Puschkat | 307/10.1 |
| 2009/0061291 | A1* | 3/2009 | Ohashi et al. | 429/65 |
| 2010/0019572 | A1* | 1/2010 | Kudo et al. | 307/10.7 |
| 2011/0045343 | A1* | 2/2011 | Barkoczi et al. | 429/178 |
| 2011/0244281 | A1 | 10/2011 | Byun | |
| 2012/0301747 | A1* | 11/2012 | Han et al. | 429/7 |
| 2013/0101883 | A1* | 4/2013 | Zhao | 429/121 |
| 2013/0288530 | A1* | 10/2013 | Zhao | 439/627 |

* cited by examiner

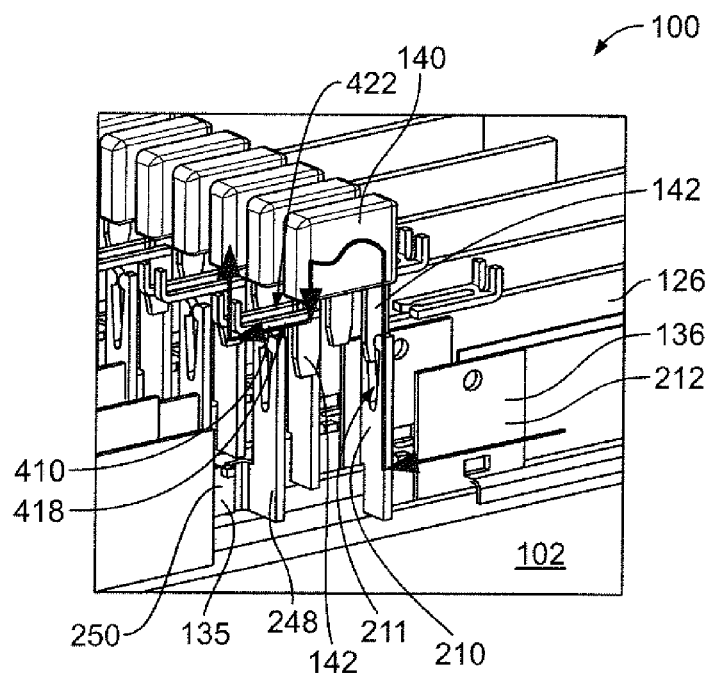
FIG. 18
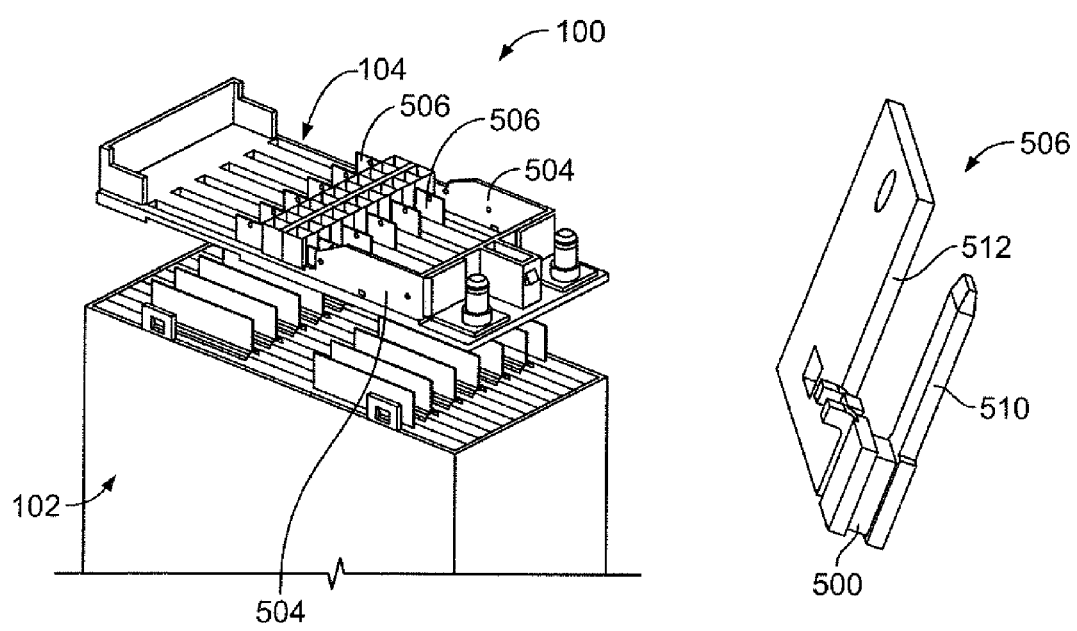
FIG. 19
FIG. 20

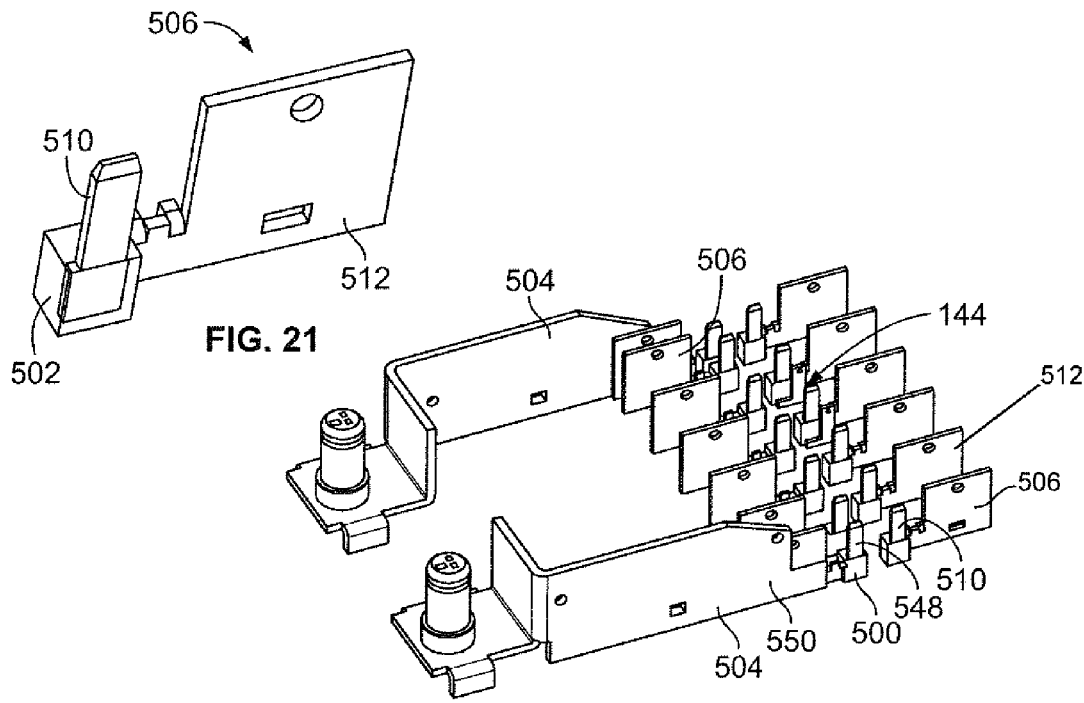
FIG. 21
FIG. 22
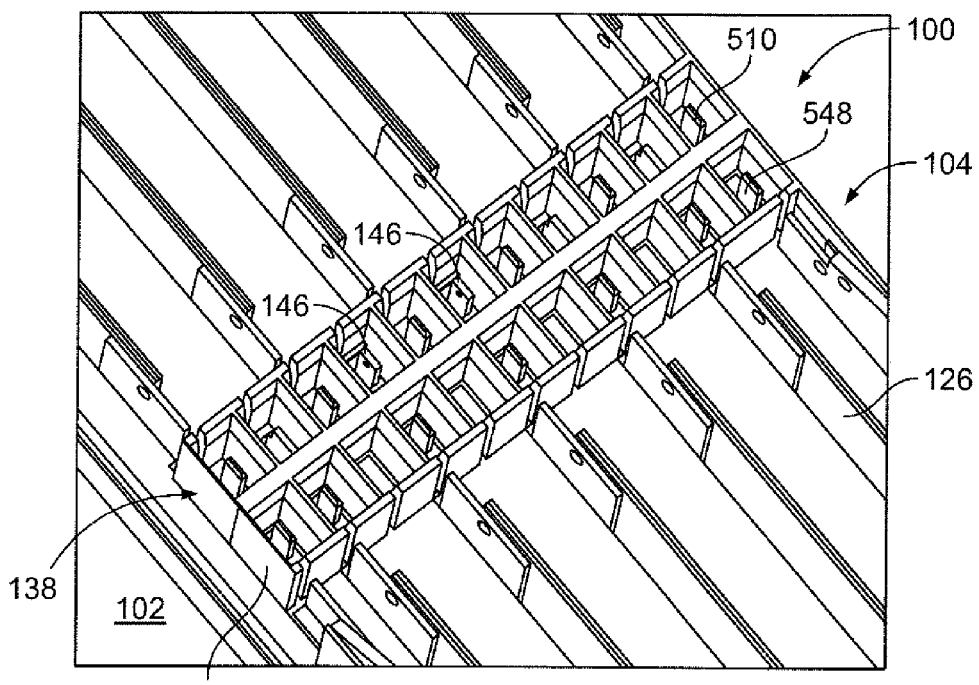
FIG. 23

BATTERY CONNECTOR SYSTEM

CROSS REFERENCE TO RELATED APPLICATIONS

This application claims the benefit of U.S. Provisional Application No. 61/630,552 filed Dec. 14, 2011, the subject matter of which is herein incorporated by reference in its entirety.

BACKGROUND OF THE INVENTION

The subject matter herein relates generally to battery connector systems.

Batteries, such as those for electric vehicles or hybrid vehicles, typically include a plurality of cells grouped together as battery modules. The modules are connected together to form battery packs. Each of the cells include positive and negative tabs that are electrically connected together. Typically, busbars are welded to the cell tabs for sensing the voltage of the cells. A central or de-central battery management system is connected to the busbars for sensing and managing the battery cells.

Problems exist with connections between the busbars and other components of the battery management system. For example, typically the systems have many parts and have a complex arrangement of the parts. Some systems have central management while other systems have de-centralized management and the components of the central management system and the de-centralized management system are not interchangeable. In current systems having a central or de-central management system, a sensing circuit is required for each busbar. Each sensing circuit may be protected by a fuse.

The fusing presents many challenges including difficulty servicing the fuse, difficulty resetting the fuse, a complex arrangement with many parts and integrating other components such as a thermistor.

BRIEF DESCRIPTION OF THE INVENTION

In an embodiment, a battery connector system is provided including a tray assembly configured to be mounted to a battery module made from a plurality of battery cells. The tray assembly has a tray and a plurality of busbars held by the tray. The tray has a tray connector defining a mating interface being configured to mate with an electrical connector. The busbars are coupled to the tray and have plates being configured to be electrically connected to corresponding cell tabs of the battery cells. The busbars have fuse terminals positioned in the tray connector. A plurality of fuses are coupled to the fuse terminals. The fuses are connected between the plates of the busbars and the electrical connector.

In another embodiment, a battery connector system is provided including a tray assembly configured to be mounted to a battery module made from a plurality of battery cells. The tray assembly includes a tray and a plurality of busbars held by the tray. The tray has a tray connector defining a mating interface. The busbars are coupled to the tray. The busbars have plates configured to be electrically connected to corresponding cell tabs of the battery cells. The busbars have fuse terminals positioned in the tray connector at the mating interface. Fuses are coupled to the fuse terminals. The fuses are configured to provide current protection circuits between the battery cells and a battery management system. The battery connector system includes a wire harness connector and a circuit board connector both configured to be coupled to the tray connector, where only one of the connectors is coupled to the tray connector at a time. The wire harness connector has a housing holding a plurality of wire harness terminals terminated to corresponding wires configured to be routed to a centralized battery management system. The wire harness terminals are configured to be electrically connected to the plates of the busbars through the corresponding fuse. The circuit board connector has a housing holding a circuit board having circuitry to perform at least one battery management function as part of a decentralized battery management system. The circuit board has a plurality of board terminals mounted thereto configured to be electrically connected to the plates of the busbars through the corresponding fuse. The tray assembly is capable of being coupled with either the wire harness connector or the circuit board connector, wherein either the wire harness connector is selectively coupled to the tray assembly or the circuit board connector is selectively coupled to the tray assembly to define either a centralized battery management system or a decentralized battery management system.

In another embodiment, a battery connector system is provided including a tray assembly configured to be mounted to a battery module made from a plurality of battery cells. The tray assembly includes a tray and a plurality of busbars held by the tray. The tray has a tray connector defining a mating interface. The busbars are coupled to the tray and have plates configured to be electrically connected to corresponding cell tabs of the battery cells. The busbars have fuse terminals positioned in the tray connector at the mating interface. An electrical connector is coupled to the tray connector. The electrical connector has fuse terminals positioned adjacent corresponding fuse terminals of the tray assembly. Optionally, the electrical connector may be a wire harness connector or a circuit board connector. The battery connector system includes fuses removably coupled to the tray assembly and the electrical connector. The fuses are serviceable fuses each having a fuse body and a pair of fuse blades. One of the fuse blades is mated with the corresponding fuse terminal of the tray assembly while the other fuse blade is mated with the corresponding fuse terminal of the electrical connector. The fuses are capable of being removed and replaced. Optionally, the battery connector system may include resettable fuses coupled to the tray assembly and the electrical connector. The resettable fuses may be of a polymer type or may have bimetal. When high current causes high heat, the polymer or bimetal will have high resistance or is switched off by high heat, respectively. The resettable fuse may be sandwiched between the corresponding buss bar and fuse terminal of the tray assembly. The fuse terminal may be mated with the corresponding fuse terminal of the electrical connector. The fuses may be resettable once the temperature decreases and the buss bar and/or fuse terminal cool down.

BRIEF DESCRIPTION OF THE DRAWINGS

FIG. 18 illustrates a portion of the battery connector system.

FIG. 19 is an exploded view of the battery connector system.

FIG. 20 is a side perspective view of an intermediate busbar formed in accordance with an exemplary embodiment for the battery connector system.

FIG. 21 is a side perspective view of the intermediate busbar with resettable fuses.

FIG. 22 shows a busbar array with resettable fuses for the battery connector system.

FIG. 23 is a top perspective view of a portion of the battery connector system with resettable fuses.

DETAILED DESCRIPTION OF THE INVENTION

Figure 1:
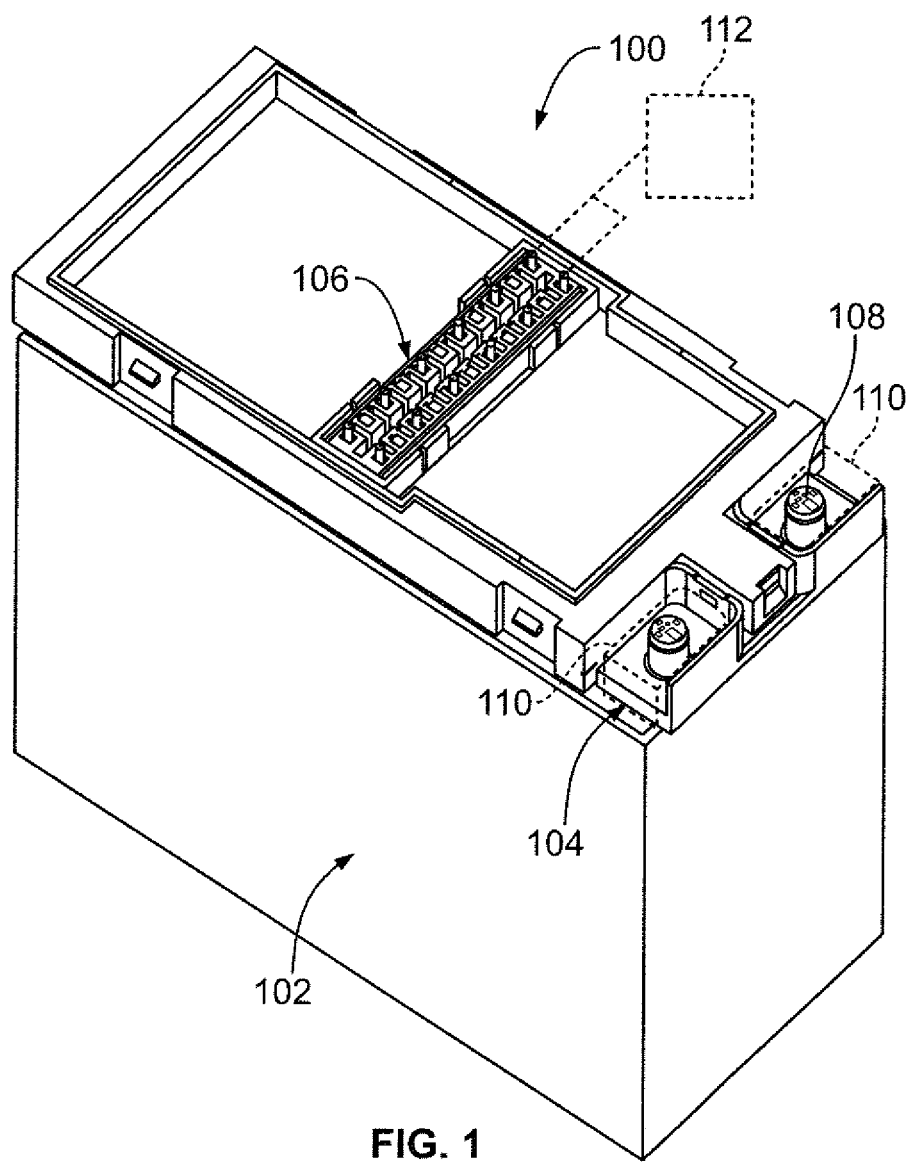
FIG. 1 illustrates a battery connector system formed in accordance with an exemplary embodiment with a wire harness connector.

Current battery modules contain a series of battery cells. Typically the cells are aligned in parallel. Each cell has a positive and negative terminal. Typically busbars are welded to the cell terminals to sense the voltage so that the control system can sense and control the battery cell. The controller may be directly attached or connected to the battery module with a printed circuit board connector or, the controller may be remotely located and connected to the battery module with a wire harness connector. A sensing circuit is established between the battery cell busbars and the controller. Each sensing circuit is protected by a fuse. Embodiments described herein provide a fused battery connector system with a serviceable or resettable fuse.

Embodiments described herein are designed to function in a centralized battery management system or a decentralized battery management system. For example, embodiments of the fused battery connector system can be used with a directly connected controller part of a printed circuit board (PCB) connector that is directly connected to the battery module as part of a decentralized battery management system. Other embodiments of the fused battery connector system can be used with a remotely connected controller using a wire harness connector that is connected to the battery module as part of a centralized battery management system.

In an exemplary embodiment, the system comprises industry standard 42V mini fuses or circuit breakers. Embodiments described herein provide the ability to service the fuses. In another exemplary embodiment, the system comprises industry standard resettable fuses such as a polymer resettable fuse.

The battery connector system may be used in any application that uses batteries. In an exemplary embodiment, the battery connector system is used in a vehicle, such as an electric vehicle or a hybrid electric vehicle. Embodiments described herein may include components described in co-pending application U.S. Ser. No. 13/278,775 which is incorporated herein by reference. For example, the battery connector system may utilize a universal or modular tray assembly that is capable of connecting to different types of electrical connectors, such as to a wire harness connector or a circuit board connector, depending on the customer's end use application. The electrical connector connects the battery module to a battery management system or controller that performs battery management functions, such as monitoring and/or controlling the operation of the components of the battery connector system and/or the battery module. The control may be performed at the battery module, such as by directly connecting a circuit board connector having the controller thereon or coupled thereto to the battery module. Alternatively, the controller may be remotely connected to the battery management system by a wire harness connector having one or more cables each having one or more wires routed to a centralized location, such as for managing multiple battery modules.

FIG. 1 illustrates a battery connector system 100 formed in accordance with an exemplary embodiment. In an exemplary embodiment, the battery connector system 100 is a fused battery connector system 100 using fuses to provide current protection circuits for the battery management system.

The battery connector system 100 includes one or more battery modules 102, a tray assembly 104 coupled to each battery module 102 and an electrical connector 106 electrically coupled to each tray assembly 104. In the illustrated embodiment, the electrical connector 106 is a wire harness connector having a plurality of cables and/or wires extending therefrom and may be referred to hereinafter as a wire harness connector 106.

As described in further detail below, in lieu of using the wire harness connector 106, the battery connector system 100 may be utilized with another type of electrical connector, such as a circuit board connector 116 (shown inn FIG. 2). The same tray assembly 104 is able to connect to either the wire harness connector 106 or the circuit board connector 116. The same components are usable with either type of connector 106, 116, making a robust and flexible battery connector system design.

The battery connector system 100 includes at least one external battery connection 108 configured to be connected to a power connector 110 (represented schematically in FIG. 1). The power connector 110 may be coupled to another battery module or another power source or component within the battery connector system 100.

The electrical connector 106 is connected to a battery management system 112 (represented schematically in FIG. 1) that monitors and/or controls the operation of the components of the battery connector system 100. The electrical connector 106 may be connected to the battery management system 112 by one or more cables each having one or more wires. In an exemplary embodiment, the battery management system 112 is a centralized system that manages the individual battery modules 102 from such central location.

Figure 2:
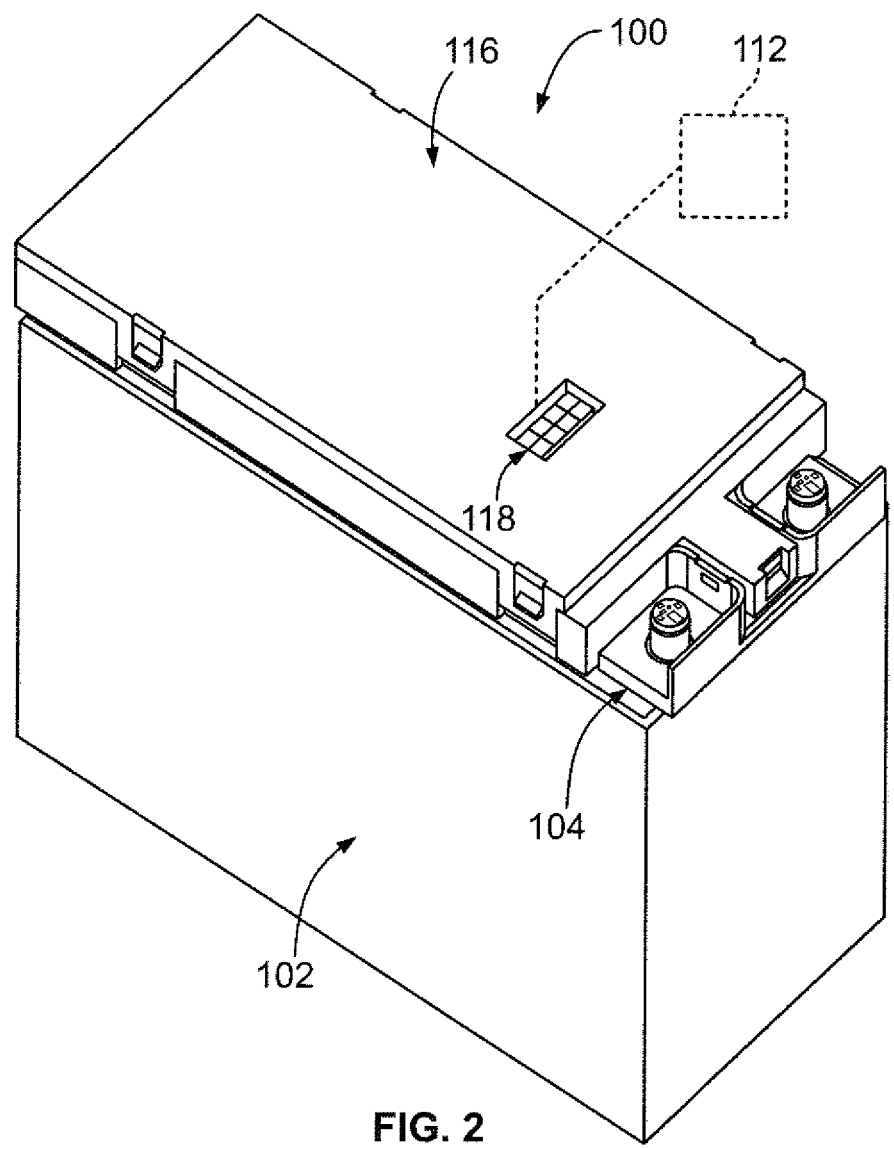
FIG. 2 shows the battery connector system with a circuit board connector.

FIG. 2 shows the battery connector system 100 with another electrical connector 116 coupled to the tray assembly 104. In the illustrated embodiment, the electrical connector 116 is a circuit board connector, as opposed to the wire harness connector 106 (shown in FIG. 1). The electrical connector 116 may be referred hereinafter as a circuit board connector 116. The electrical connector 116 allows for decentralized control by having monitoring and/or control elements built into the electrical connector 116 as opposed to having the monitoring and control functions performed by the battery management system 112. One or more battery management functions may be performed by the circuit board connector 116. In an exemplary embodiment, the electrical connector 116 may also be connected to the battery management system 112 for overall health monitoring and/or control of the battery connector system 100, while still allowing some monitoring and/or control functions built into the electrical connector 116. For example, a cable mounted plug (not shown) may be coupled to an external connector 118 of the electrical connector 116, and the cable routed to the battery management system 112.

In an exemplary embodiment, both the circuit board connector 116 and the wire harness connector 106 may be coupled to the same tray assembly 104. The tray assembly 104 allows for selective coupling of different types of electrical connectors (e.g., the circuit board connector 116, the wire harness connector 106, or other types of electrical connectors) thereto. The tray assembly 104 allows for interchangeability between systems that use decentralized control with the circuit board connector 116 and systems that use centralized control with the wire harness connector 106. The same components can be used for the battery modules 102 irrespective of using the wire harness connector 106 or the circuit board connector 116. The tooling cost for the battery connector system 100 may be reduced by utilizing the tray assembly 104 to connect with both the wire harness connector 106 and the circuit board connector 116.

The battery connector system 100 may measure the battery health of the battery module 102. The battery connector system 100 may measure the battery status of the battery module 102. The battery connector system 100 may monitor for overvoltage and/or low voltage situation with the battery module 102. The battery connector system 100 may monitor the temperature of the battery module 102. The battery connector system 100 may perform a balancing function for the battery module 102. The battery connector system 100 may manage charging functions of the battery module 102. Such monitoring and/or control functions may be performed by the battery management system 112 and/or the circuit board connector 116.

Figure 3:
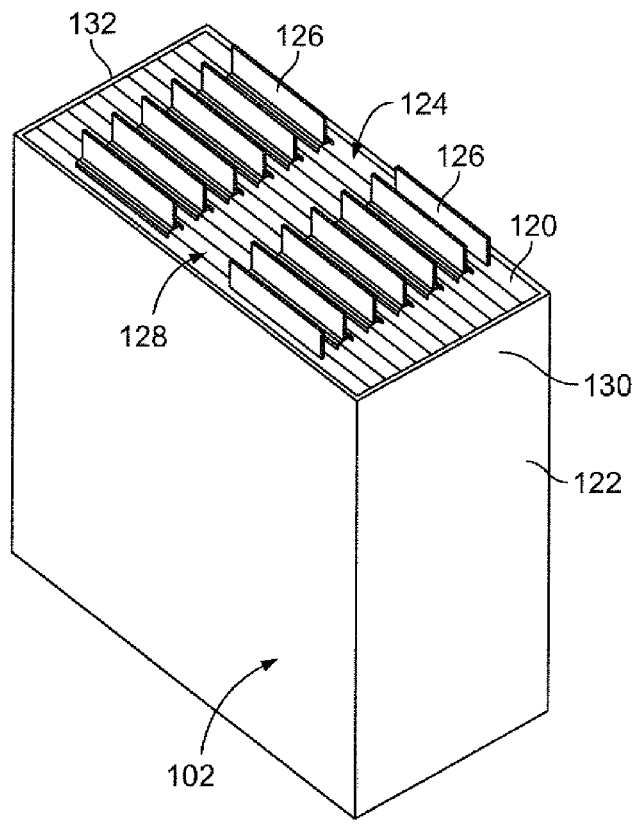
FIG. 3 is an exploded view of the battery connector system showing a tray assembly poised for mounting to a battery module.

FIG. 3 is an exploded view of the battery connector system 100 showing the tray assembly 104 poised for mounting to the battery module 102. The battery module 102 includes a plurality of battery cells 120 housed within a container 122. The battery cells 120 may be any type of battery cells. For example, the battery cells 120 may be pouch battery cells or prismatic battery cells. Other types of battery cells may be used in alternative embodiments. Optionally, the battery cells 120 may be narrow plates arranged in a stacked configuration.

Any number of battery cells 120 may be provided in the battery module 102. The battery cells 120 have a top 124. Each battery cell 120 includes two cell tabs 126. The cell tabs 126 extend from the top 124 of the battery cells 120. One cell tab 126 defines a positive tab while the other cell tab 126 defines a negative cell tab. Optionally, the battery cells 120 may be arranged such that the positive cell tabs of adjacent battery cells 120 are adjacent one another and/or engage one another and such that the negative cells tabs of adjacent battery cells are adjacent one another and/or engage one another. In an exemplary embodiment, all battery cell positive and negative tabs are flipped back and forth such that one positive cell tab is aligned with its adjacent negative cell tab. The battery cells are configured as a series circuit.

A gap 128 is provided between two groups of cell tabs 126. The first group of cell tabs 126 is provided between the gap 128 and a first side 130 of the battery module 102. The second group of cell tabs 126 is provided between the gap 128 and a second side 132 of the battery module 102. Portions of the tray assembly 104 are positioned and aligned with the gap 128 when assembled.

In the illustrated embodiment, the cell tabs 126 are thin rectangular tabs that extend from the top 124. The cell tabs 126 may have other shapes in alternative embodiments. The cell tabs 126 are planar, however the cell tabs 126 may be nonplanar in alternative embodiments.

The tray assembly 104 is configured to be mounted to the top of the battery module 102. The tray assembly 104 is configured to be mounted over the cell tabs 126. The cell tabs 126 are configured to extend through the tray assembly 104 to be electrically connected to components of the tray assembly 104.

The tray assembly 104 includes a tray 134 and a plurality of busbars 135, 136 held by the tray 134. The busbars 135 represent post busbars 135 having posts defining the external battery connections 108 (shown in FIG. 1), while the busbars 136 represent intermediate busbars 136 positioned between the post busbars 135. Each of the busbars 135, 136 are configured to be connected to the battery management system 112 (shown in FIG. 1). Each of the busbars 135, 136 are configured to be connected to a fused circuit for current protection for the battery management system 112.

The tray assembly 104 includes a tray connector 138 configured to mate with the wire harness connector 106 (shown in FIG. 1) or the circuit board connector 116 (shown in FIG. 2). The tray connector 138 defines a mating interface configured to mate with either the wire harness connector 106 or the circuit board connector 116, depending on the particular application. Portions of the busbars 135, 136 are configured to be located in, and define portions of, the tray connector 138 for electrical connection to the wire harness connector 106 or the circuit board connector 116. Portions of the busbars 135, 136 are positioned exterior of the tray connector 138 and are configured to be electrically connected to corresponding cell tabs 126. For example, the busbars 135, 136 may be welded or joined to the cell tabs 126. The busbars 135, 136 create an electrical path between the battery cells 120 and the wire harness connector 106 or the circuit board connector 116. In an exemplary embodiment, the busbars 135, 136 form part of a fused electrical path that provides circuit protection using a serviceable fuse 140 (shown in FIG. 4). Other types of fused systems may be used in alternative embodiments, such as resettable fuses integrated into the busbars or between the busbars and the other components of the battery management system 112. The tray assembly may provide an interface for a thermistor assembly 144 (shown in FIG. 5) with the electrical connectors 106, 116.

Figure 4:
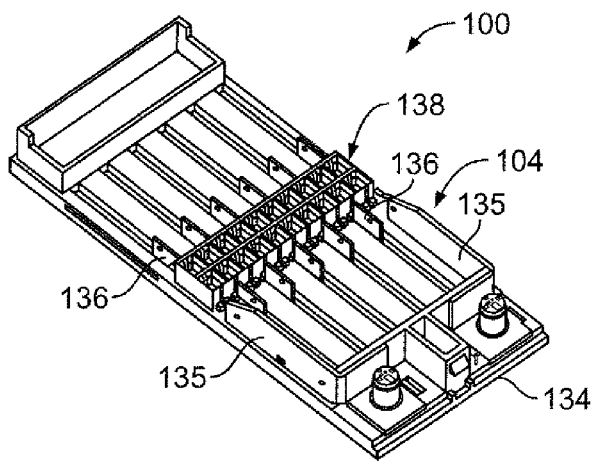
FIG. 4 illustrates a serviceable fuse for the battery connector system.
Figure 4:
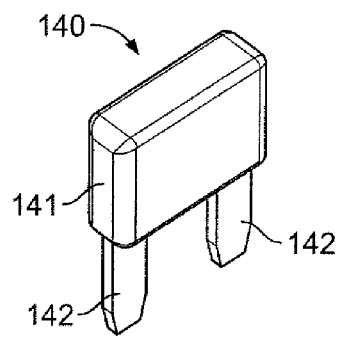

FIG. 4 illustrates a serviceable fuse 140. In an exemplary embodiment, the fuse 140 may be an industry standard 42V mini fuse, however other types of fuses or circuit breakers may be used in alternative embodiments. The fuse 140 includes a generally rectangular body 141. First and second fuse blades 142 extend from the body 141. The fuse 140 may be plugged into the system and removed and replaced once damaged or blown.

Figure 5:
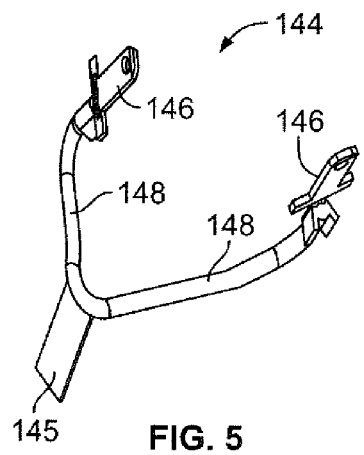
FIG. 5 illustrates a thermistor assembly for the battery connector system.

FIG. 5 illustrates the thermistor assembly 144 that is used to monitor a temperature of the battery module 102. The thermistor assembly 144 includes a thermistor sensor 145 that is configured to engage one or more battery cells 120 (shown in FIG. 3) to monitor the temperature of such battery cell(s) 120. The thermistor sensor may span across the tops 124 of multiple battery cells 120. Alternatively, the thermistor sensor may extend between two adjacent battery cells 120. The thermistor sensor may be thin and flexible to allow for easy placement along the corresponding battery cells 120.

The thermistor assembly 144 includes thermistor contacts 146 electrically connected to the thermistor sensor. The thermistor contacts 146 are configured to be coupled to the tray assembly 104 for electrical connection to the wire harness connector 106 (shown in FIG. 1) or the circuit board connector 116 (shown in FIG. 2) when such electrical connectors are mated to the tray assembly 104. The thermistor contacts 146 may be of any type and have any shape configured for making an electrical connection with the electrical connectors 106, 116.

In an exemplary embodiment, the thermistor contacts 146 are connected to the thermistor sensor by wires 148 extending therebetween. Alternatively, the thermistor contacts 146 may be coupled to the thermistor sensor by other means, such as a direct electrical connection. Optionally, the thermistor contacts 146 may be integral with the thermistor sensor. Any number of thermistor contacts 146 may be connected to the thermistor sensor. The thermistor assembly 144 may include any number of thermistor sensors.

Figure 6:
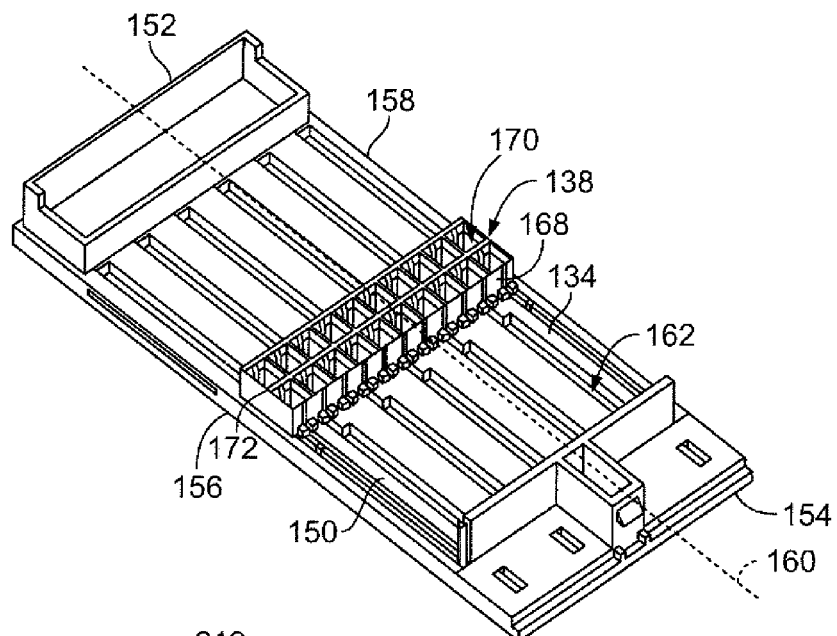
FIG. 6 is a top perspective view of a portion of the tray assembly.

FIG. 6 is a top perspective view of the tray 134 of the tray assembly 104 (shown in FIG. 3). The tray 134 includes a base 150 that extends between first and second sides 152, 154 of the tray 134. The base 150 is manufactured from a dielectric material, such as a plastic material. The base 150 extends between first and second edges 156, 158 of the tray 134. In the illustrated embodiment, the base 150 is generally rectangular in shape, however the base 150 may have other shapes in alternative embodiments. The first and second sides 152, 154 extending generally parallel to one another, however the first and second sides 152, 154 may be non-parallel in alternative embodiments. The first and second edges 156, 158 extend parallel to one another, however the first and second edges 156, 158 may be non-parallel in alternative embodiments.

The base 150 extends along a longitudinal axis 160 that is parallel to the first and second edges 156, 158. In an exemplary embodiment, the tray connector 138 is generally centrally located along the longitudinal axis 160 between the first and second sides 152, 154. Optionally, the tray connector 138 may extend entirely across the base 150 between the first and second edges 156, 158. The tray connector 138 may be positioned along other portions of the base 150 in alternative embodiments.

In an exemplary embodiment, a plurality of channels 162 extend through the base 150. The channels 162 are elongated in the direction of the longitudinal axis 160. The channels 162 extend entirely through the base 150. The channels 162 are configured to receive the cell tabs 126 (shown in FIG. 3) when the tray 134 is mounted to the battery module 102. Optionally, the channels 162 may receive portions of the busbars 135, 136 (shown in FIG. 3). In an exemplary embodiment, the channels 162 are provided on both sides of the tray connector 138, such as between the tray connector 138 and the first side 152 and between the tray connector 138 and the second side 154. The channels 162 are sized and shaped to receive the cell tabs 126 and/or the busbars 135, 136.

The tray connector 138 includes shroud walls 168 extending upward from the base 150. The shroud walls 168 define a plurality of chambers 170. The chambers 170 have open tops 172 that are configured to receive the wire harness connector 106 (shown in FIG. 1) or the circuit board connector 116 (shown in FIG. 2). In an exemplary embodiment, the chambers 170 are rectangular in cross-section, however the chambers 170 may have different shapes in alternative embodiments. In the illustrated embodiment, the chambers 170 are arranged in two rows that extend parallel to the first and second sides 152, 154.

Figure 7:
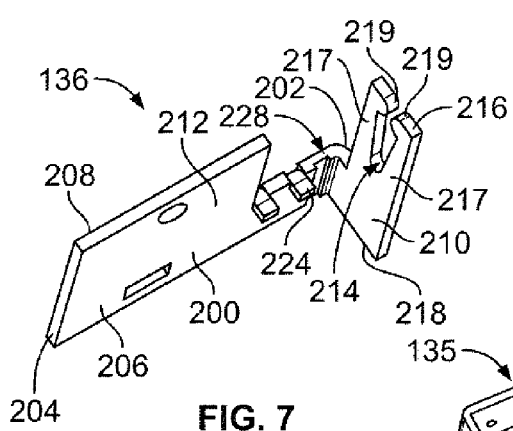
FIG. 7 is a side perspective view of an intermediate busbar of the tray assembly.

FIG. 7 is a side perspective view of the intermediate busbar 136. The busbar 136 includes a main body 200 extending between a first end 202 and a second end 204. The busbar 136 has a first side 206 and a second side 208. Optionally, the first and second sides 206, 208 may be generally planar. The first and second sides 206, 208 may be generally parallel to one another. Optionally, the busbar 136 may be stamped and formed. The busbar 136 includes a fuse terminal 210 at the first end 202. The fuse terminal 210 may be located remote from the first end 202 in alternative embodiments. The busbar 136 includes main section or plate 212 defined by the main body 200. Optionally, the plate 212 may be provided at the second end 204. The plate 212 is configured to be directly electrically connected to the cell tabs 126 (shown in FIG. 3). Optionally, the fuse terminal 210 may be oriented perpendicular to the plate 212.

In an exemplary embodiment, the fuse terminal 210 constitutes a fork terminal 210 having a slot 214 configured to receive the fuse blade 142 of the fuse 140 (both shown in FIG. 4). In alternative embodiments, the fuse terminal 210 may be a blade terminal or have other terminal forms. The fuse terminal 210 has a top end 216 and a bottom end 218. The slot 214 extends from the top end 216 defining first and second legs 217. Tabs 219 extend from each first and second leg 217 adjacent the top end 216. The fuse terminal 210 is configured to be received within the tray connector 138 (shown in FIG. 1) and is configured to receive the fuse blade 142.

The busbar 136 includes a plurality of locating features 224 configured to locate the busbar 136 with respect to the tray 134 (shown in FIG. 3). The locating features 224 may be used to hold the vertical and/or horizontal position of the busbar 136 with respect to the tray 134. In an exemplary embodiment, the busbar 136 includes a necked portion 228 proximate to the fuse terminal 210. The necked portion 228 is thinner than the main body 200. The necked portion 228 allows the busbar 136, in the area of the necked portion 228, to be more flexible than other portions of the busbar 136. The necked portion 228 allows the fuse terminal 210 to move side-to-side, such as to locate the fuse terminal 210 for mating with the wire harness connector 106 or the circuit board connector 116.

Figure 8:
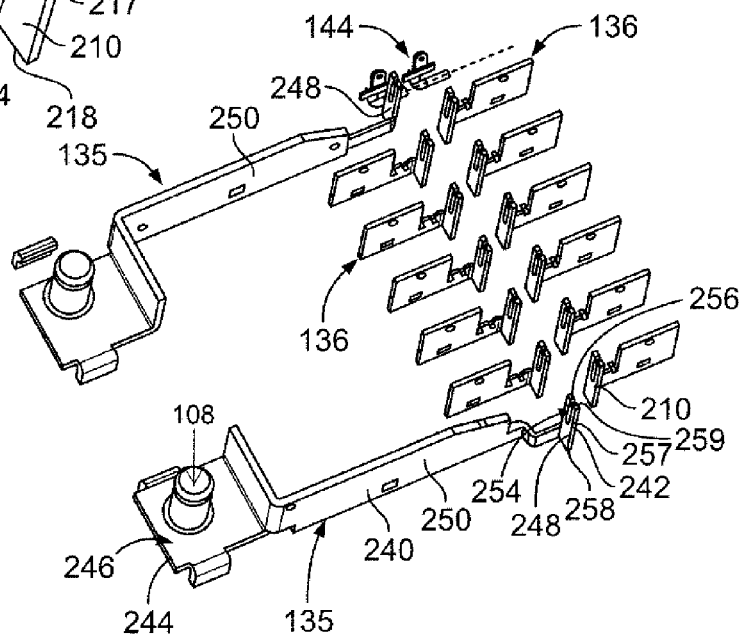
FIG. 8 is an exploded perspective view of a busbar array of the tray assembly.

FIG. 8 is an exploded perspective view of a busbar array including the post busbars 135, intermediate busbars 136 and integrated thermistor assembly 144. The post busbars 135 define the external battery connections 108 for the battery connector system. The intermediate busbars 136 are located between the post busbars 135.

The post busbar 135 includes a main body 240 extending between a first end 242 and a second end 244. The main body 240 may be defined by a post section 246 and a terminal section or fuse terminal 248. The post section 246 is provided at the second end 244. The fuse terminal 248 is provided at the first end 242. The post section 246 defines the external battery connection 108. The fuse terminal 248 defines the mating portion of the busbar 135 with the fuse 140 and/or other electrical connectors, such as the wire harness connector 106 (shown in FIG. 1) or the circuit board connector 116 (shown in FIG. 2).

The post section 246 includes a plate 250. The plate 250 is configured to be directly electrically connected to the cell tabs 126 (shown in FIG. 3). Optionally, the fuse terminal 248 may be oriented perpendicular to the plate 250.

In an exemplary embodiment, the fuse terminal 248 constitutes a fork terminal 248 having a slot 254 configured to receive the fuse blade 142 of the fuse 140 (both shown in FIG. 4). In alternative embodiments, the fuse terminal 248 may be a blade terminal or have other terminal forms. The fuse terminal 248 has a top end 256 and a bottom end 258. The slot 254 extends from the top end 256 defining first and second legs 257. Tabs 259 extend from each first and second leg 257 adjacent the top end 256. The fuse terminal 248 is configured to be received within the tray connector 138 (shown in FIG. 1) and is configured to receive the fuse blade 142.

Figure 9:
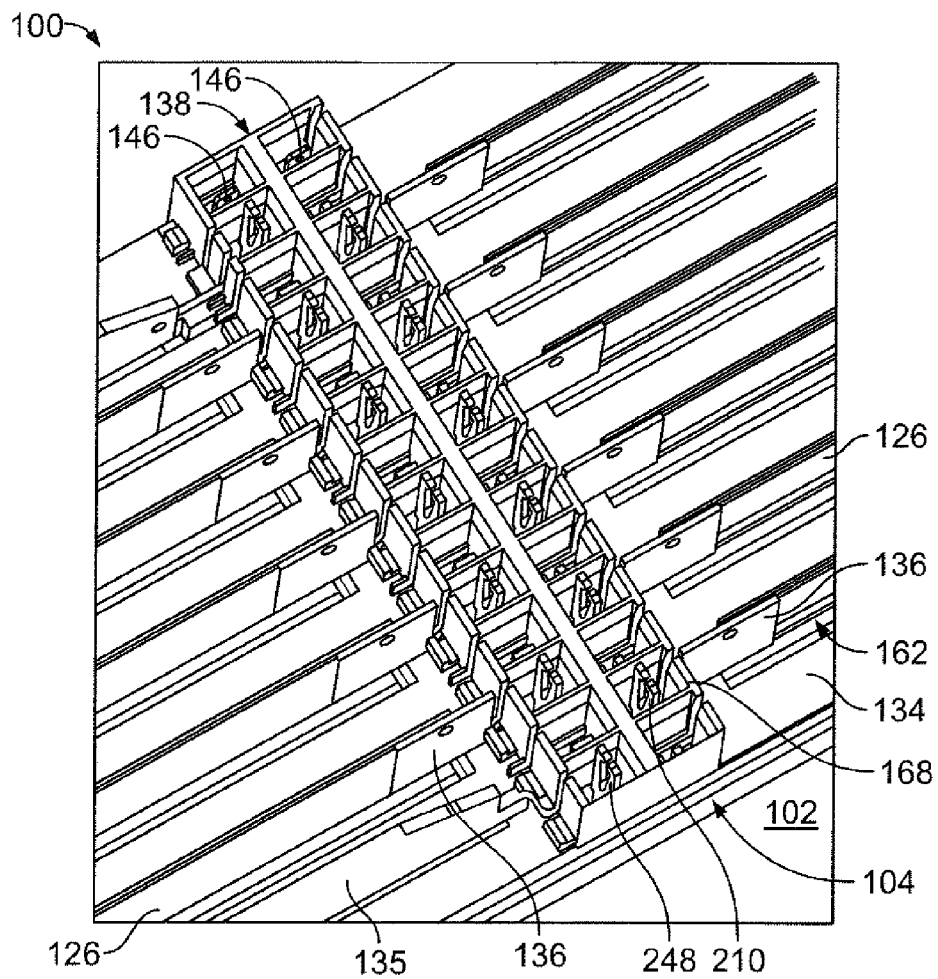
FIG. 9 is a top perspective view of a portion of the battery connector system.

FIG. 9 is a top perspective view of a portion of the battery connector system 100 showing the tray assembly 104 coupled to the battery module 102. The fuse terminals 210, 248 extend through the shroud walls 168 of the tray connector 138 for mating with the fuses 140 (shown in FIG. 4). The fuses 140 may be removably coupled to the tray 134. The thermistor contacts 146 extend through the tray connector 138 and are configured to be mated with the selected wire harness connector 106 or the circuit board connector 116.

Optionally, the busbars 135, 136 are coupled to the tray 134 prior to the tray assembly 104 being coupled to the battery module 102. The busbars 135, 136 are located in the channels 162 and held in the tray 134 such that the busbars 135, 136 can be moved slightly relative to the tray 134, such as to adjust the horizontal position of the busbars 135, 136 relative to the tray 134. The tray assembly 104 is coupled to the top of the battery module 102 such that the cell tabs 126 extend through corresponding channels 162. The busbars 135, 136 extend along, and engage, corresponding cell tabs 126. The busbars 135, 136 are electrically connected to corresponding cell tabs 126. For example, the busbars 135, 136 may be welded to the cell tabs 126. Optionally, the busbars 135, 136 may be ultrasonically welded to the cell tabs 126. The busbars 135, 136 may be electrically connected to the cell tabs 126 by other means or processes in alternative embodiments, such as by using a mechanical interference via a deflectable spring beam, by riveting or staking, or by other processes. Having the busbars 135, 136 held and pre-positioned by the tray 134 reduces the effects of vibration of the busbars 135, 136 relative to the cell tabs 126, which can prolong the connection between the busbars 135, 136 and the cell tabs 126.

Figure 10:
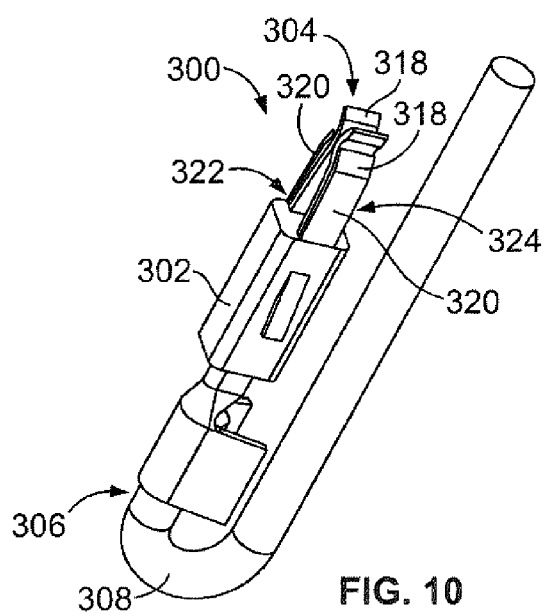
FIG. 10 illustrates a wire harness terminal for the wire harness connector.

FIG. 10 illustrates a wire harness terminal 300 for the wire harness connector 106 (shown in FIG. 1). The terminal 300 includes a body 302 having a mating end 304 and a terminating end 306. The mating end 304 is configured to be mated with a corresponding fuse blade 142 (shown in FIG. 4), and thus the wire harness terminal 300 defines a fuse terminal and may be referred to hereinafter as a fuse terminal 300.

The terminating end 306 is configured to be terminated to a wire 308. For example, the terminating end 306 may be crimped to the wire 308. The terminating end 306 may be terminated to the wire 308 by other means or processes in alternative embodiments, such as by soldering, insulation displacement and the like. Optionally, the body 302 may be a two piece body.

The wire harness terminal 300 includes beams 318 having mating interfaces configured to engage the fuse blade 142. The beams 318 oppose one another and are deflectable. In an exemplary embodiment, the wire harness terminal 300 includes stiffeners 320 positioned outside of the beams 318. The stiffeners 320 engage the beams 318 and impart an inward normal force against the beams 318 forcing the beams 318 towards one another. When the fuse 140 is mated with the wire harness terminal 300, the stiffeners 320 force the beams 318 against the corresponding fuse blade 142. In an exemplary embodiment, the mating end 304 is open-sided having open sides 322, 324 between the beams 318. The open sides 322, 324 allow the fuse blade 142 to extend outward through the open side 322 and/or 324.

Figure 11:
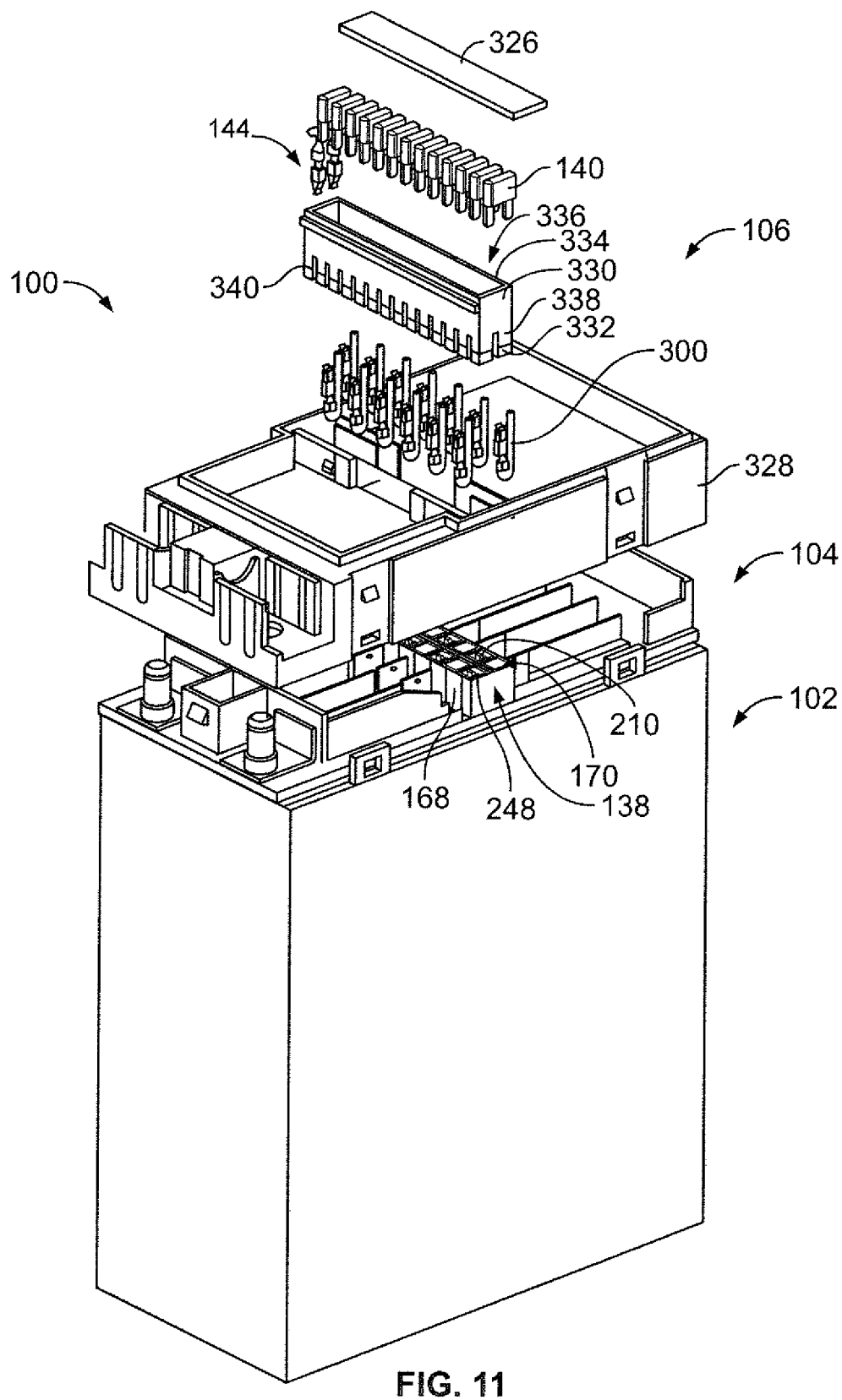
FIG. 11 is an exploded view of the battery connector system formed in accordance with an exemplary embodiment.

FIG. 11 is an exploded view of the battery connector system 100 formed in accordance with an exemplary embodiment. FIG. 11 illustrates the wire harness connector 106 poised for mounting to the tray assembly 104 on the battery module 102. The battery connector system 100 shown in FIG. 11 includes the battery module 102, the tray assembly 104, the wire harness connector 106, a plurality of the wire harness terminals 300, the thermistor assembly 144, a plurality of the fuses 140 and a fuse cover 326. The wire harness connector 106 is configured to be coupled to the tray assembly 104.

The wire harness connector 106 includes a housing 328 configured to be coupled to the tray assembly 104 and an insert 330 received in the housing 328. The insert 330 holds the wire harness terminals 300 and corresponding wires. The insert 330 extends between a mating end 332 and a wire end 334. The mating end 332 is configured to be mated with the tray connector 138. The insert 330 has a plurality of openings 336 extending through the insert 330 between the mating end 332 and the wire end 334. The openings 336 receive the wire harness terminals 300. In an exemplary embodiment, the wire harness terminals 300 are loaded into the openings 336 through the mating end 332.

The insert 330 includes a plurality of towers 338. The towers 338 are separated by spaces 340. Each tower 338 has a corresponding opening 336. The wire harness terminals 300 are received in corresponding towers 338. The towers 338 are loaded into corresponding chambers 170 of the tray connector 138. The spaces 340 are sized and located to receive corresponding shroud walls 168 when the towers 338 are received in the chambers 170.

The fuses 140 are configured to be loaded into the insert 330 to mate with the wire harness terminals 300 and the fuse terminals 210, 248. The fuses 140 are removable from the insert 330, such as to replace damaged or blown fuses. The fuse cover 326 is configured to be coupled to the insert 330 to cover the fuses 140. The cover 326 is removable to service the fuses 140, such as to replace blown fuses.

Figure 12:
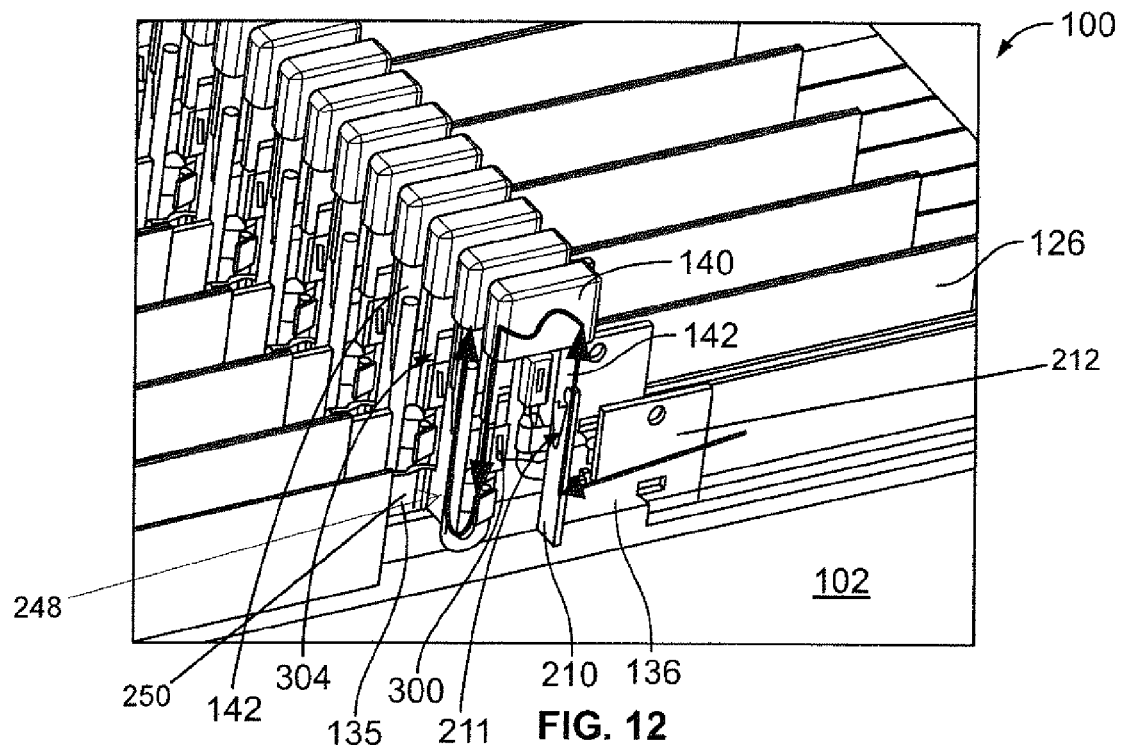
FIG. 12 illustrates a portion of the battery connector system.

FIG. 12 illustrates a portion of the battery connector system 100 showing the assembly of the fuses 140 and the fuse terminals 210, 248, 300. The fuse blades 142 of the fuses 140 are mated with both the wire harness terminals 300 and the fork terminals 210, 248 of the busbars 135, 136. The fuses 140 are assembled into the fused battery connector system 100 to protect the sensing connection between the battery module 102 and the control module, such as the battery management system 112 (shown in FIG. 1). The fuses 140 are located in the fused paths defined between the cell tab 126/associated plate 212, 250 and the electrical connector 106, which includes the fuse terminals 300 defined by the wire harness terminals 300. Each fused path passes through the corresponding fuse 140.

During assembly, a first fuse blade 142 is fit within the slot 211 of the fork terminal 210 of the busbar 136. The second fuse blade 142 is fit within the mating end 304 of the wire harness terminal 300. During use, sensing current flows from the battery cell tab 126 passing through the busbars 135, 136, through the fork terminals 210, 248, through the corresponding fuse 140, through the wire harness terminal 300 and passes to the wire harness connector 106. The wire harness connector 106 is then mated to an external sensor management circuit, such as part of the battery management system 112.

Figure 13:
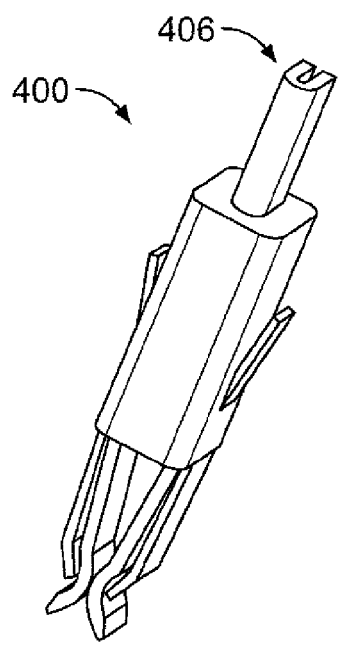
FIG. 13 illustrates a thermistor board terminal of the battery connector system.

FIG. 13 illustrates a thermistor board terminal 400 for the circuit board connector 116 (shown in FIG. 2). The thermistor board terminal 400 may be similar to the wire harness terminal 300 (shown in FIG. 10), however the terminal 400 may have a different terminating end 406 than the terminating end 306 (shown in FIG. 11). The thermistor board terminal 400 is configured to be terminated to a circuit board rather than a wire, such as using a compliant pin or compliant portion at the terminating end 406 or soldering.

Figure 14:
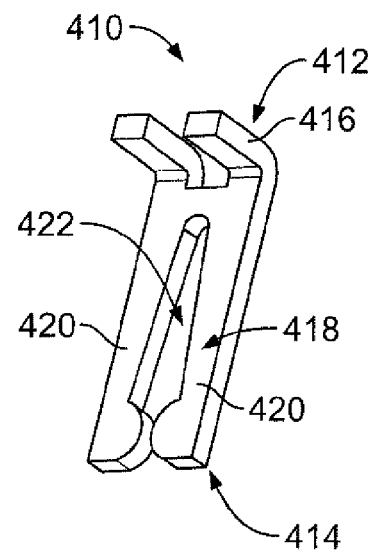
FIG. 14 illustrates a board terminal for the circuit board connector.

FIG. 14 illustrates a board terminal 410 for the circuit board connector 116 (shown in FIG. 2). The board terminal 410 includes a mounting end 412 and a terminal end 414. In the illustrated embodiment, the mounting end 412 includes one or more pins 416 to mount to a circuit board. However, numerous alternative configurations and methods of attaching the board terminal 410 to a circuit board would be suitable. The terminal end 414 includes a fork terminal 418 similar to fork terminal 210 (shown in FIG. 7). The fork terminal 418 is configured to receive one of the fuse blades 142 of the fuse 140 (both shown in FIG. 4). The fork terminal 418 includes legs 420 on opposite sides of a slot 422.

Figure 15:
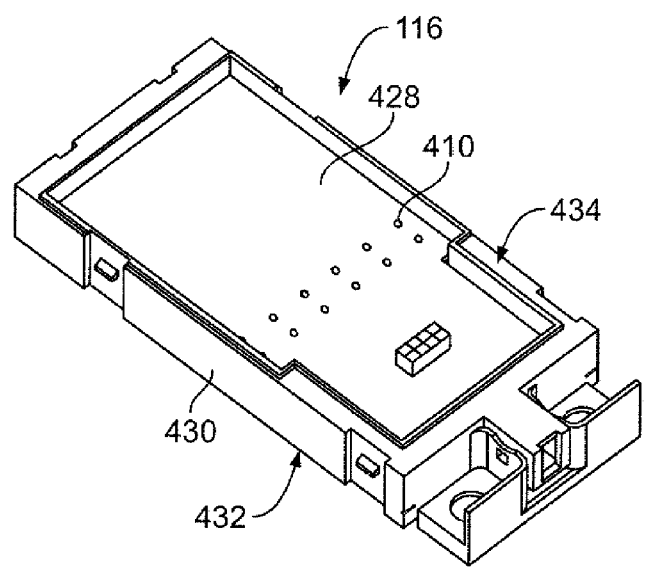
FIG. 15 is a top perspective view of the circuit board connector.

FIG. 15 is a top perspective view of the circuit board connector 116. The circuit board connector 116 is configured to be coupled to the tray connector 138 (shown in FIG. 3). The circuit board connector 116 may be interchangeable with the wire harness connector 106 (shown in FIG. 1).

The circuit board connector 116 includes a circuit board 428 that is received in a housing 430. The housing 430 extends between a mating end 432 and an outer end 434. The mating end 432 is configured to be mated with the tray connector 138. The board terminals 410 are coupled to a bottom side of the circuit board 428. The circuit board 428 is received in the housing 430 through the outer end 434.

Figure 16:
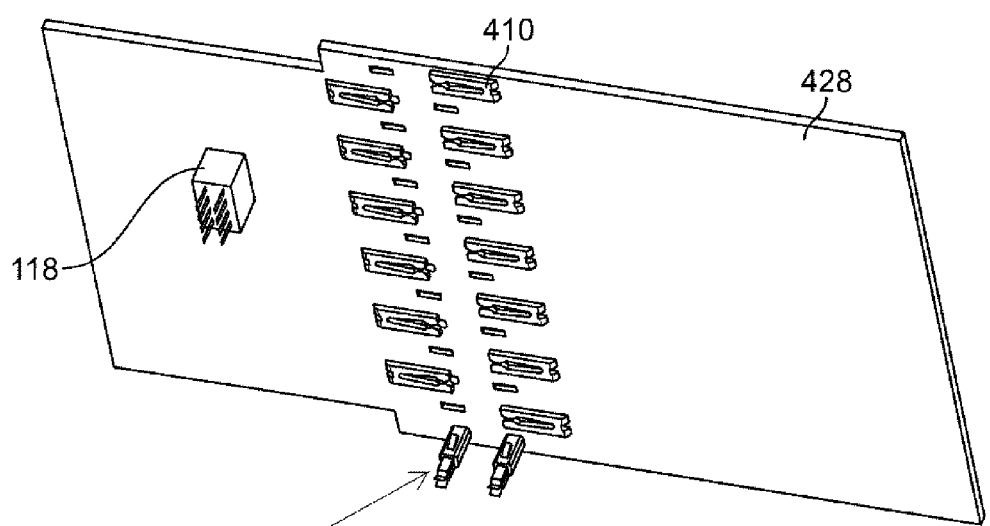
FIG. 16 is a bottom perspective view of a portion of the circuit board connector.

FIG. 16 is a bottom perspective view of the circuit board 428 and the board terminals 410 mounted to the circuit board 428. Various electrical components and/or circuitry may be coupled to or provided on the circuit board 428 that are used to perform at least one battery management function, such as to monitor and/or control the battery module 102 (shown in FIG. 2). Such electrical components may be electrically connected to one or more of the board terminals 410. Such electrical components and/or the board terminals 410 may be electrically connected to the external connector 118, which is mounted to the circuit board 428. The circuit board 428 includes one or more thermistor board terminals 400 mounted thereto.

Figure 17:
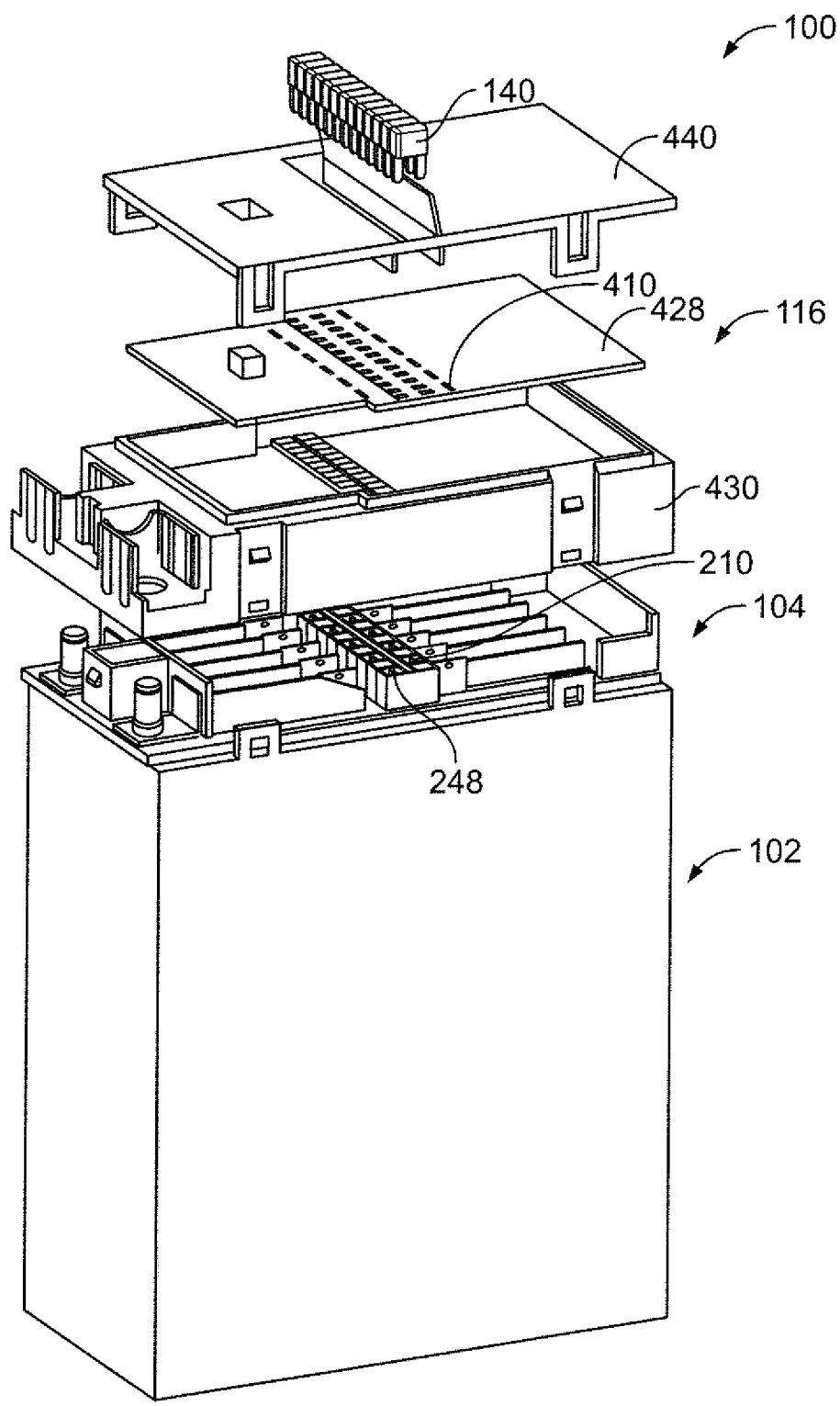
FIG. 17 is an exploded perspective view of the battery connector system formed in accordance with an exemplary embodiment.

FIG. 17 is an exploded perspective view of the battery connector system 100 formed in accordance with an exemplary embodiment. FIG. 17 illustrates the circuit board connector 116 poised for mounting to the tray assembly 104 on the battery module 102. The battery connector system 100 shown in FIG. 17 includes the battery module 102, the tray assembly 104, the circuit board connector 116, a plurality of the fuses 140 and a cover 440. The circuit board connector 116 is configured to be coupled to the tray assembly 104. The circuit board connector 116 may be interchangeable with the wire harness connector 106 in other embodiments.

The fuses 140 are configured to be loaded through the circuit board 428 from above. The fuses 140 pass through openings in the circuit board 428 to mate with the board terminals 410 (shown in FIG. 16) and the fuse terminals 210, 248. The cover 440 holds the circuit board 428 in the housing 430 and may cover the fuses 140 when assembled. The fuses 140 are removable from the circuit board connector 116, such as to replace damaged or blown fuses.

FIG. 18 illustrates a portion of the battery connector system 100 showing the assembly of the fuses 140 and the fuse terminals 210, 248, 410. The fuse blades 142 of the fuses 140 are mated with both the board terminals 410 and the fork terminals 210, 248 of the busbars 135, 136. The fuses 140 are assembled into the fused battery connector system 100 to protect the sensing connection between the battery module 102 and the control module, such as the battery management system 112 (shown in FIG. 2). The fuses 140 are located in the fused paths defined between the cell tab 126/associated plate 212, 250 and the electrical connector 116, which includes the fuse terminals 410 defined by the board terminals 410. Each fused path passes through the corresponding fuse 140.

During assembly, a first fuse blade 142 is fit within the slot 211 of the fork terminal 210 of the busbar 136. The second fuse blade 142 is fit within the slot 422 of the fork terminal 418. During use, sensing current flows from the battery cell tab 126 passing through the busbars 135, 136, through the fork terminals 210, 248, through the corresponding fuse 140, through the board terminal 410 and passes to the circuit board 428 (shown in FIG. 17). The circuitry of the circuit board 428 performs at least one battery management function. Optionally, the sensing current may flow to the battery management system 112 (shown in FIG. 2) via the external connector 118 (shown in FIG. 16).

Similar to FIG. 3, FIG. 19 is an exploded view of the battery connector system 100 showing the tray assembly 104 poised for mounting to the battery module 102. The tray assembly 104 holds post busbars 504 and intermediate busbars 506. Like components are identified using like reference numerals. FIG. 19 illustrates the battery connector system 100 having a tray assembly 104 that uses resettable fuses as opposed to serviceable fuses. The battery connector system 100 configured for use with either a circuit board connector or a wire harness connector using the same tray assembly 104. The tray assembly 104 allows for selective coupling of different types of electrical connectors (e.g., the circuit board connector 116, the wire harness connector 106, or other types of electrical connectors) thereto. The tray assembly 104 allows for interchangeability between systems that use decentralized control with the circuit board connector 116 and systems that use centralized control with the wire harness connector 106. The same components can be used for the battery modules 102 irrespective of using the wire harness connector 106 or the circuit board connector 116. The tooling cost for the fused battery connector system 100 may be reduced by utilizing the tray assembly 104 to connect with both the wire harness connector 106 and the circuit board connector 116.

FIG. 20 is a side perspective view of an intermediate busbar 506, which is similar to the intermediate busbar 136 (shown in FIG. 7). The busbar 506 includes a fuse terminal 510 and a plate 512. The fuse terminal 510 is a blade terminal rather than a fork terminal as with the fuse terminal 210 (shown in FIG. 7). In contrast to the embodiment shown in FIG. 7, the fuse terminal 510 is separate and discrete from the plate 512 and a resettable fuse 500 is provided between the plate 512 and the fuse terminal 510.

The resettable fuse 500 creates an electrical path between the plate 512 and the fuse terminal 510. The resettable fuse 500 may open or provide high resistance during a high current condition. For example, the resettable fuse 500 may be a bi-metal component that opens under high current or high temperature conditions. Once the high current or high temperature condition ceases, the bi-metal component may close once again, thus resetting itself, and allow current to flow through the busbar 506. In another embodiment, the resettable fuse 500 may be a polymer switch that is temperature sensitive. Under high current conditions, the temperature of the polymer switch may exceed a threshold causing the polymer switch to have high resistance to current flow. After the high current condition ceases, the polymer switch may change state and allow current flow through the busbar 506 between the plate 512 and the fuse terminal 510. Other types of resettable fuses may be used in alternative embodiments. The resettable fuse 500 does not require human intervention to reset fuse to allow normal operation again after a high current condition has been experienced.

FIG. 21 is a side perspective view of the intermediate busbar 506 showing a case 502 around portions of the fuse terminal 510 and the plate 512 as well as encasing the resettable fuse 500 (shown in FIG. 20). The case 502 protects the components of the busbar 506. The case 502 may provide structural support for the components of the busbar 506. In an exemplary embodiment, the case 502 is made of plastic but other materials may be suitable.

FIG. 22 shows a busbar array including post busbars 504 (which include resettable fuses 500, a plate 550 and a fuse terminal 548), intermediate busbars 506 and the thermistor assembly 144. The fuse terminals 510, 548 of the busbars 504, 506 are positioned for insertion into the tray connector 138 (shown in FIG. 23).

FIG. 23 is a top perspective view of a portion of the battery connector system 100 showing the tray assembly 104 coupled to the battery module 102. The fuse terminals 510, 548 extend through the shroud walls 168 of the tray connector 138 for mating with the selected electrical connector 106 or 116. The thermistor contacts 146 extend through the tray connector 138 and are configured to be mated with the selected electrical connector 106 or 116.

The busbars 504, 506 extend along, and engage, corresponding cell tabs 126. The busbars 504, 506 are electrically connected to corresponding cell tabs 126. For example, the busbars 504, 506 may be welded to the cell tabs 126.

Figure 24:
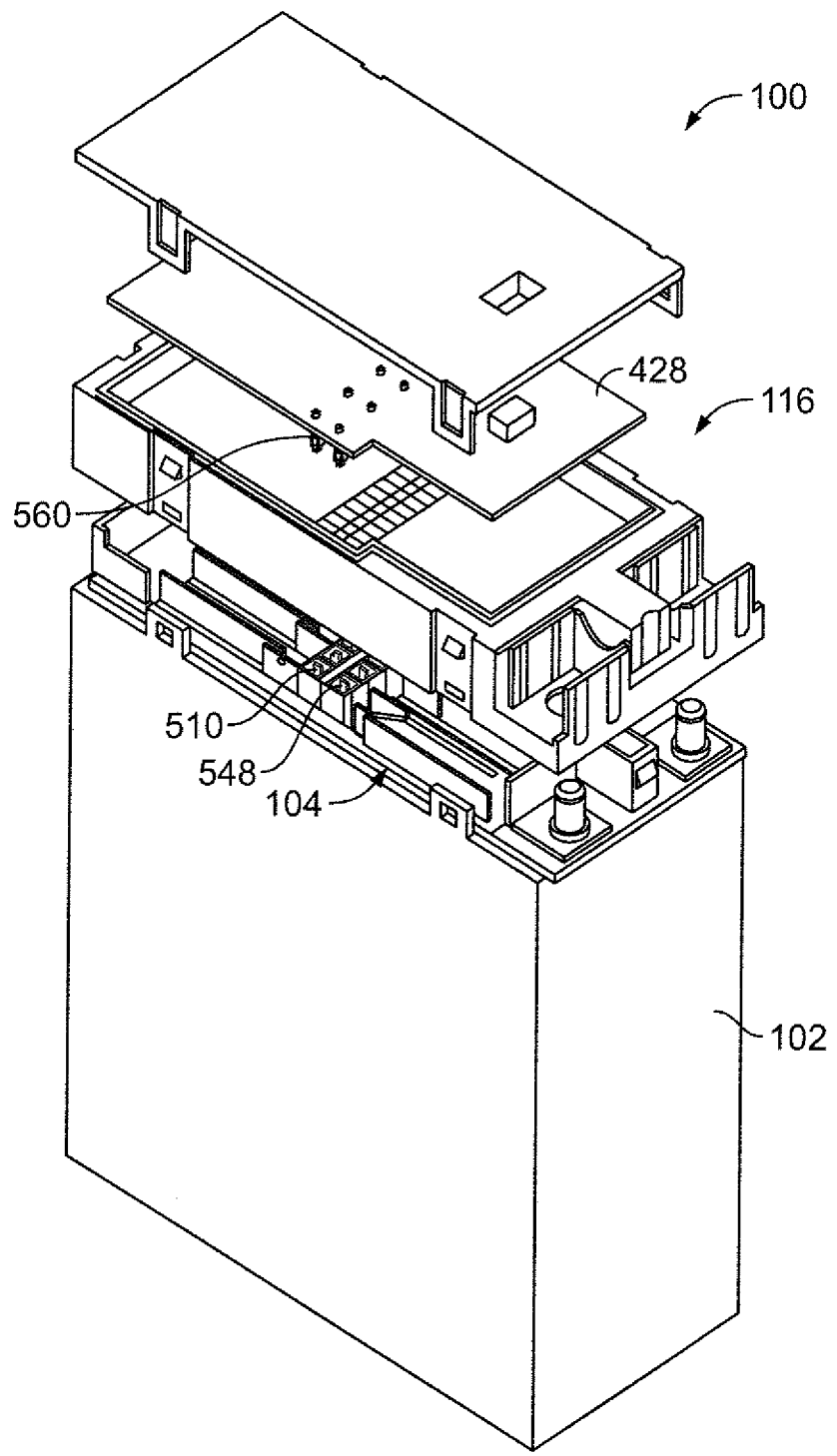
FIG. 24 is an exploded view of the battery connector system formed in accordance with an exemplary embodiment.

FIG. 24 is an exploded view of the battery connector system 100 formed in accordance with an exemplary embodiment using the resettable fuses 500. FIG. 24 illustrates the circuit board connector 116 being coupled to the tray assembly 104. The battery connector system 100 shown in FIG. 24 includes the battery module 102, the tray assembly 104, the circuit board connector 116, one or more thermistor board terminals 400 (shown in FIG. 13), a plurality of board terminals 560 coupled to the circuit board 428, and a plurality of the fuse terminals 510, 548 with resettable fuses 500 (shown in FIG. 22) associated therewith. The circuit board connector 116 is configured to be coupled to the tray assembly 104. The circuit board connector 116 may be interchangeable with the wire harness connector 106 in other embodiments.

The board terminals 560 may be identical to the thermistor board terminals 400. The board terminals 560 have compliant terminal ends 562 that are configured to be mechanically and electrically connected to the circuit board 428. The board terminals 560 may be side open terminals having a pair of beams configured to be terminated to the fuse terminals 510, 548. The board terminals 560 define part of the current protection path with the associated fuses 500 and thus define fuse terminals and may be referred to hereinafter as fuse terminals 560.

Figure 25:
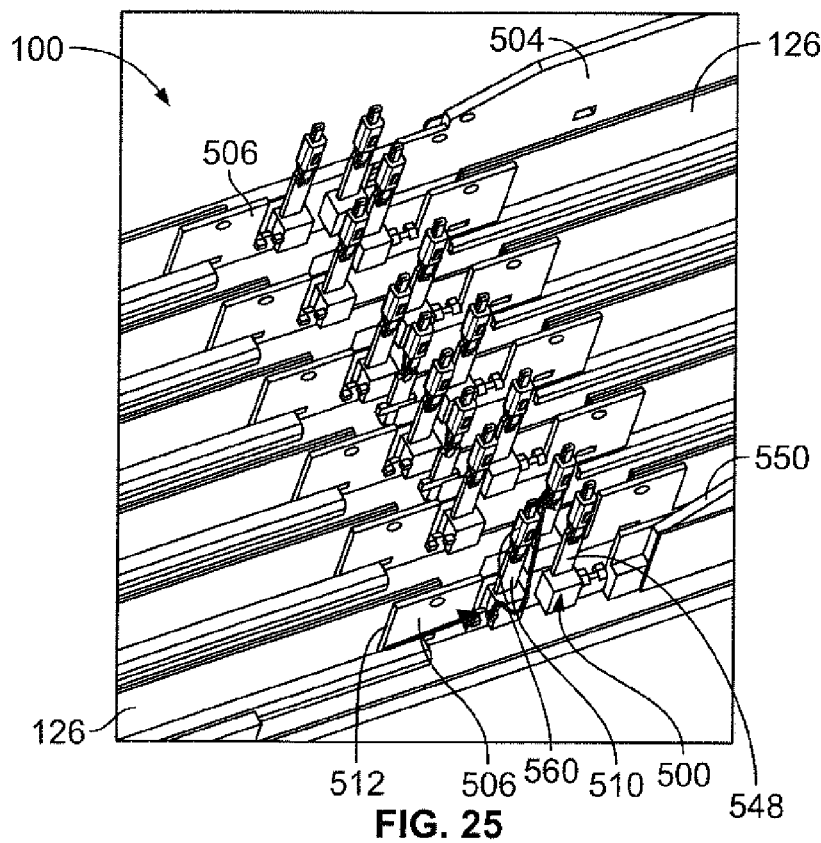
FIG. 25 illustrates a portion of the battery connector system.

FIG. 25 illustrates a portion of the battery connector system 100 showing the assembly of the fuses 500 and the fuse terminals 510, 548, 560. The fuse 500 is mounted within the terminal section of each busbar 504, 506. The fuse 500 is located in the fused path defined between the cell tab 126/associated plate 512, 550 and the electrical connector 116, which includes the fuse terminals 560 defined by the board terminals 560. The fuse 500 is integrally assembled within the battery system 100 to protect the sensing connection between the battery module and the control module. The busbars 504, 506 are attached to the battery cell tabs 126. The blade terminals 510, 548 of the busbars 504, 506 are connected to the mating end of the board terminals 560. Terminating ends of the board terminals 560 are mounted to the circuit board 428 (shown in FIG. 24). In the embodiment shown in FIG. 25, when assembled, the sensing current flows from the battery cell tab 126 passing through the busbar 506, through the fuse 500, through the fuse terminal 510, through the board terminal 560 and into the circuit board 428.

Figure 26:
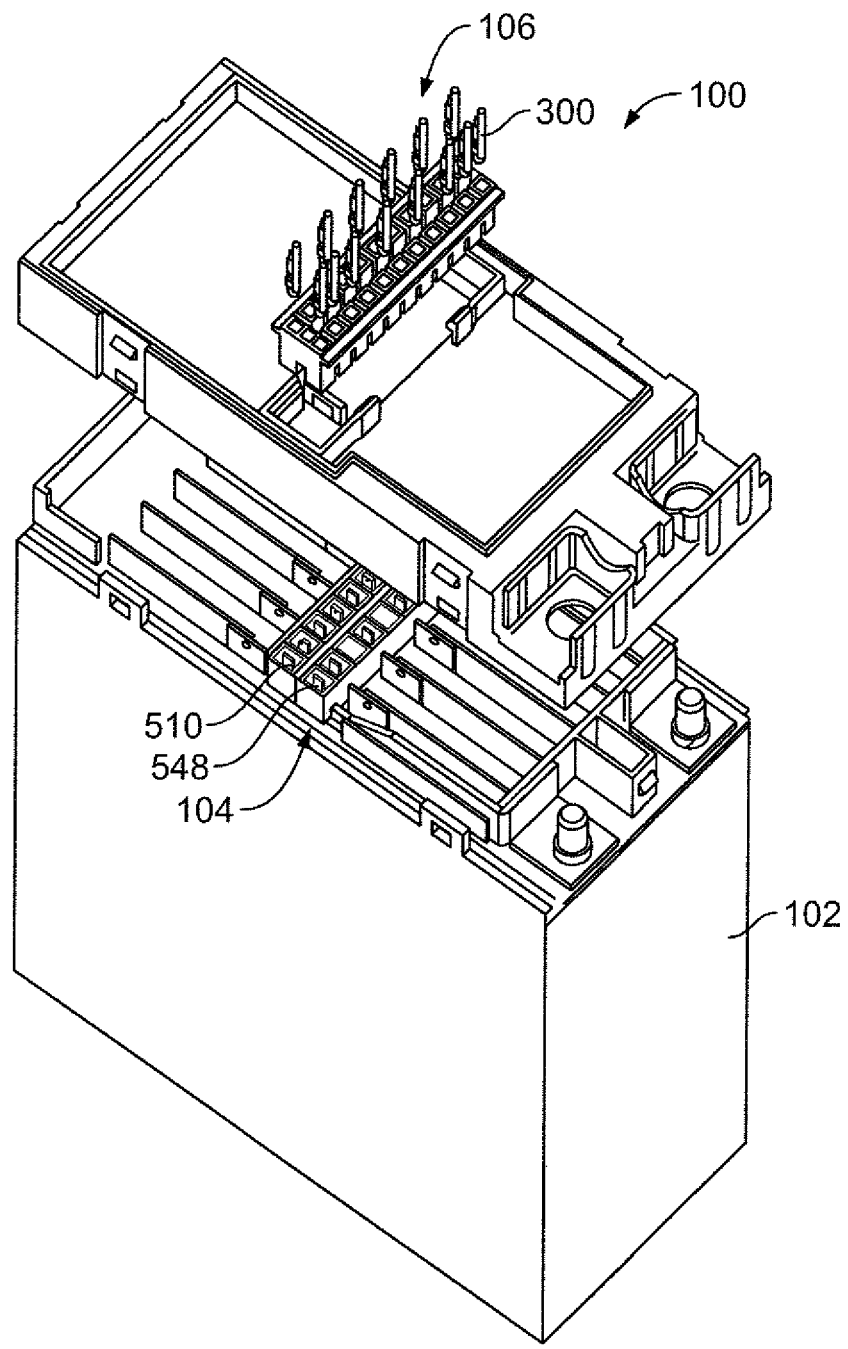
FIG. 26 is an exploded view of the battery connector system formed in accordance with an exemplary embodiment.

FIG. 26 is an exploded view of the battery connector system 100 formed in accordance with an exemplary embodiment using the wire harness connector 106. FIG. 26 illustrates the wire harness connector 106 being coupled to the tray assembly 104. The battery connector system 100 shown in FIG. 26 includes the battery module 102, the tray assembly 104, the wire harness connector 106, wire harness terminals 300, and a plurality of the fuse terminals 510, 548 with resettable fuses 500 (shown in FIG. 22) associated therewith. The wire harness connector 106 is configured to be coupled to the tray assembly 104. The wire harness connector 106 may be interchangeable with the circuit board connector 116 in other embodiments.

Figure 27:
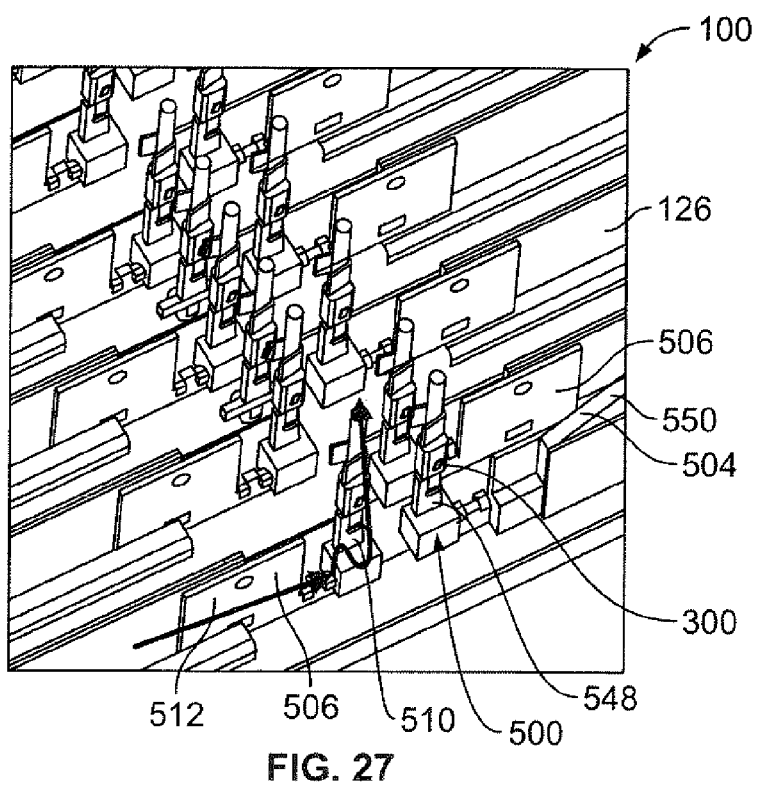
FIG. 27 illustrates a portion of the battery connector system.

FIG. 27 illustrates a portion of the battery connector system 100 showing the assembly of the fuses 500 and the fuse terminals 510, 548, 300. The fuse 500 is mounted within the terminal section of each busbar 504, 506. The fuse 500 is located in the fused path defined between the cell tab 126/associated plate 512, 550 and the electrical connector 106, which includes the fuse terminals 300 defined by the wire harness terminals 300. The fuse 500 is integrally assembled within the battery system 100 to protect the sensing connection between the battery module and the control module. The busbars 504, 506 are attached to the battery cell tabs 126. The blade terminals 510, 548 of the busbars 504, 506 are connected to the wire harness terminals 300. In the embodiment shown in FIG. 27, when assembled, the sensing current flows from the battery cell tab 126 passing through the busbar 506, through the fuse 500, through the fuse terminal 510, through the wire harness terminal 300 and to the battery management system 112 (shown in FIG. 1).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A battery connector system comprising:
a tray assembly configured to be mounted to a battery module made from a plurality of battery cells, the tray assembly comprising a tray and a plurality of busbars held by the tray;
the tray having a tray connector defining a mating interface being configured to mate with an electrical connector;
the busbars being coupled to the tray, the busbars having plates being configured to be electrically connected to corresponding cell tabs of the battery cells, the busbars having fuse terminals positioned in the tray connector; and
a plurality of fuses coupled to the fuse terminals, the fuses being connected between the plates of the busbars and the electrical connector.

2. The battery connector system of claim 1, further comprising a terminal coupled directly to the fuse terminal, the terminal being positioned between the fuse terminal and the electrical connector.

3. The battery connector system of claim 1, wherein fused paths are created between the electrical connector and the plates of the busbars, each fuse path passing through the corresponding fuse.

4. The battery connector system of claim 1, wherein the fuse terminal comprises a fork terminal, the fuse comprises a serviceable fuse having a fuse blade, the fuse being removably coupled to the tray, the fuse blade being coupled to the fork terminal when the fuse is coupled to the tray.

5. The battery connector system of claim 1, wherein the fuse is a resettable fuse mounted between the plate and the fuse terminal of the busbar.

6. The battery connector system of claim 1, further comprising a wire harness connector as the electrical connector, the wire harness connector having a housing holding a plurality of wire harness terminals, the housing being coupled to the tray, the wire harness terminals being terminated to corresponding wires configured to be routed to a centralized battery management system, the wire harness terminals being electrically connected to the plates of the busbars through the corresponding fuse.

7. The battery connector system of claim 6, wherein the fuse terminal comprises a fork terminal, the fuse comprises a serviceable fuse having a pair of fuse blades, the fuse being removably coupled to the tray, the fuse blades being coupled to the corresponding fork terminal and wire harness terminal when the fuse is coupled to the tray.

8. The battery connector system of claim 6, wherein the fuses are resettable fuses mounted between the plates and the corresponding fuse terminals of the busbars, the wire harness terminals being directly coupled to the corresponding fuse terminals when the wire harness connector is coupled to the tray assembly.

9. The battery connector system of claim 1, further comprising a circuit board connector as the electrical connector, the circuit board connector having a housing holding a circuit board, the housing being coupled to the tray, the circuit board having circuitry to perform at least one battery management function, the circuit board having a plurality of board terminals mounted thereto, the board terminals being electrically connected to the plates of the busbars through the corresponding fuse.

10. The battery connector system of claim 9, wherein the fuse terminal comprises a fork terminal, the fuse comprises a serviceable fuse having a pair of fuse blades, the fuse being removably coupled to the tray, the fuse blades being plugged through the circuit board to be coupled to the corresponding fork terminal and board terminal.

11. The battery connector system of claim 9, wherein the fuses are resettable fuses mounted between the plates and the corresponding fuse terminals of the busbars, the board terminals being directly coupled to the corresponding fuse terminals when the circuit board connector is coupled to the tray assembly.

12. The battery connector system of claim 1, further comprising a thermistor assembly having a thermistor sensor for measuring a temperature of at least one battery cell, the thermistor assembly including a thermistor contact coupled to the thermistor sensor and extending into the tray connector for electrical connection to the electrical connector.

13. A battery connector system comprising:
a tray assembly configured to be mounted to a battery module made from a plurality of battery cells, the tray assembly comprising a tray and a plurality of busbars held by the tray, the tray having a tray connector defining a mating interface, the busbars being coupled to the tray, the busbars having plates being configured to be electrically connected to corresponding cell tabs of the battery cells, the busbars having fuse terminals positioned in the tray connector at the mating interface;
fuses coupled to the fuse terminals, the fuses configured to provide current protection circuits between the battery cells and a battery management system;
a wire harness connector configured to be coupled to the tray connector, the wire harness connector having a housing holding a plurality of wire harness terminals, the wire harness terminals being terminated to corresponding wires configured to be routed to a centralized battery management system, the wire harness terminals being configured to be electrically connected to the plates of the busbars through the corresponding fuse; and
a circuit board connector configured to be coupled to the tray connector, the circuit board connector having a housing holding a circuit board, the circuit board having circuitry to perform at least one battery management function as part of a decentralized battery management system, the circuit board having a plurality of board terminals mounted thereto, the board terminals being configured to be electrically connected to the plates of the busbars through the corresponding fuse;
wherein the tray assembly is capable of being coupled with either the wire harness connector or the circuit board connector, and wherein either the wire harness connector is selectively coupled to the tray assembly or the circuit board connector is selectively coupled to the tray assembly to define either a centralized battery management system or a decentralized battery management system.

14. The battery connector system of claim 13, wherein the fuse terminal comprises a fork terminal, the fuse comprises a serviceable fuse having a fuse blade, the fuse being removably coupled to the tray, the fuse blade being coupled to the fork terminal when the fuse is coupled to the tray.

15. The battery connector system of claim 13, wherein the fuse is a resettable fuse mounted between the plate and the fuse terminal of the busbar.

16. The battery connector system of claim 13, wherein the fuse terminal comprises a fork terminal, the fuse comprises a serviceable fuse having a pair of fuse blades, the fuse being removably coupled to the tray, one of the fuse blades being coupled to the corresponding fork terminal and the other fuse blade being coupled to either the wire harness terminal when the wire harness connector is coupled to the tray assembly or the board terminal when the circuit board connector is coupled to the tray assembly.

17. The battery connector system of claim 13, wherein the fuses are resettable fuses mounted between the plates and the corresponding fuse terminals of the busbars, the fuse terminals being directly coupled to either the wire harness terminal when the wire harness connector is coupled to the tray assembly or the board terminal when the circuit board connector is coupled to the tray assembly.

18. The battery connector system of claim 13, further comprising a thermistor assembly having a thermistor sensor for measuring a temperature of at least one battery cell, the thermistor assembly including a thermistor contact coupled to the thermistor sensor and extending into the tray connector for electrical connection to either the wire harness connector when the wire harness connector is coupled to the tray assembly or the circuit board connector when the circuit board connector is coupled to the tray assembly.

19. A battery connector system comprising:
a tray assembly configured to be mounted to a battery module made from a plurality of battery cells, the tray assembly comprising a tray and a plurality of busbars held by the tray, the tray having a tray connector defining a mating interface, the busbars being coupled to the tray, the busbars having plates being configured to be electrically connected to corresponding cell tabs of the battery cells, the busbars having fuse terminals positioned in the tray connector at the mating interface;
an electrical connector coupled to the tray connector, the electrical connector having fuse terminals positioned adjacent corresponding fuse terminals of the tray assembly; and
fuses removably coupled to the tray assembly and the electrical connector, the fuses being serviceable fuses each having a fuse body and a pair of fuse blades, one of the fuse blades being mated with the corresponding fuse terminal of the tray assembly, the other fuse blade being mated with the corresponding fuse terminal of the electrical connector, the fuses being capable of being removed and replaced.

20. The battery connector system of claim 19, further comprising a cover covering the tray assembly and the electrical connector, the fuses being accessible through the cover and being removable without removing the cover.

21. The battery connector system of claim 19, further comprising a wire harness connector as the electrical connector, the wire harness connector being coupled to the tray connector, the wire harness connector having a housing holding the fuse terminals of the electrical connector, the fuse terminals of the electrical connector being terminated to corresponding wires configured to be routed to a centralized battery management system, the fuse terminals of the electrical connector being electrically connected to the plates of the busbars through the corresponding fuse.

22. The battery connector system of claim 19, further comprising a circuit board connector as the electrical connector, the circuit board connector being coupled to the tray connector, the circuit board connector having a housing holding a circuit board, the circuit board having circuitry to perform at least one battery management function, the fuse terminals of the electrical connector being terminated to the circuit board, the fuse terminals of the electrical connector being electrically connected to the plates of the busbars through the corresponding fuse.

\* \* \* \* \*